United States Patent
Zhu et al.

(10) Patent No.: US 9,165,199 B2
(45) Date of Patent: Oct. 20, 2015

(54) CONTROLLED HUMAN POSE ESTIMATION FROM DEPTH IMAGE STREAMS

(75) Inventors: Youding Zhu, Raymond, OH (US); Behzad Dariush, Sunnyvale, CA (US); Kikuo Fujimura, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 843 days.

(21) Appl. No.: 12/455,257

(22) Filed: May 29, 2009

(65) Prior Publication Data
US 2009/0252423 A1    Oct. 8, 2009

Related U.S. Application Data

(63) Continuation-in-part of application No. 12/317,369, filed on Dec. 19, 2008.

(60) Provisional application No. 61/016,298, filed on Dec. 21, 2007, provisional application No. 61/204,869, filed on Jan. 9, 2009.

(51) Int. Cl.
*G06K 9/46* (2006.01)
*G06K 9/32* (2006.01)
*G06K 9/00* (2006.01)

(52) U.S. Cl.
CPC .............. *G06K 9/32* (2013.01); *G06K 9/00201* (2013.01); *G06K 9/00369* (2013.01)

(58) Field of Classification Search
None
See application file for complete search history.

(56) References Cited

U.S. PATENT DOCUMENTS

| | | | |
|---|---|---|---|
| 5,815,397 A | 9/1998 | Saito et al. | |
| 6,363,160 B1 | 3/2002 | Bradski et al. | |
| 6,674,877 B1 * | 1/2004 | Jojic et al. | 382/103 |
| 6,788,809 B1 | 9/2004 | Grzeszczuk et al. | |
| 6,853,964 B1 | 2/2005 | Rockwood et al. | |
| 7,135,003 B2 | 11/2006 | Dariush | |
| 7,457,733 B2 * | 11/2008 | Maille et al. | 703/2 |
| 8,090,155 B2 | 1/2012 | Lacey et al. | |
| 2003/0113018 A1 | 6/2003 | Nefian et al. | |
| 2005/0271279 A1 * | 12/2005 | Fujimura et al. | 382/203 |
| 2006/0269145 A1 | 11/2006 | Roberts | |
| 2007/0162164 A1 | 7/2007 | Dariush | |
| 2007/0255454 A1 | 11/2007 | Dariush | |
| 2008/0247649 A1 | 10/2008 | Cheng | |
| 2009/0074252 A1 | 3/2009 | Dariush | |
| 2009/0118863 A1 | 5/2009 | Dariush | |

OTHER PUBLICATIONS

Sigal, Leonid; Black, Michael J; "Measure Locally, Reason Globally: Occlusion-sensitive Articulated Pose Estimation"; 2006; IEEE Computer Society Conference on Computer Vision and Pattern Recognition (CVPR'06) 0-7695-2597-0/06.*

(Continued)

*Primary Examiner* — Kim Vu
*Assistant Examiner* — Fred Hu
(74) *Attorney, Agent, or Firm* — Fenwick & West LLP

(57) ABSTRACT

A system, method, and computer program product for estimating human body pose are described. According to one aspect, anatomical features are detected in a depth image of a human actor. The method detects a head, neck, and trunk (H-N-T) template in the depth image, and detects limbs in the depth image based on the H-N-T template. The anatomical features are detected based on the H-N-T template and the limbs. An estimated pose of a human model is estimated based on the detected features and kinematic constraints of the human model.

22 Claims, 24 Drawing Sheets
(15 of 24 Drawing Sheet(s) Filed in Color)

(56) References Cited

OTHER PUBLICATIONS

Agarwal, A. et al., "Recovering 3d Human Pose from Monocular Images," *IEEE Transactions on Pattern Analysis and Machine Intelligence*, Jan. 2006, vol. 28, No. 1, pp. 44-58.

Barron, C., et al., "Estimating Anthropometry and Pose from a Single Image," *Computer Vision and Pattern Recognition*, 2000, vol. 1, pp. 669-676.

Chan, T. et al., "A Weighted Least-Norm Solution Based Scheme for Avoiding Joint Limits for Redundant Joint Manipulators," Apr. 1995, *IEEE Transactions on Robotics and Automation*, vol. 11, No. 2.

Dariush, B., et al., "Online and Markerless Motion Retargeting with Kinematic Constraints," *International Conference on Intelligent Robots and Systems*, Sep. 22-26, 2008, pp. 191-198, Nice, France.

Gavrila, D. "The Visual Analysis of Human Movement: A Survey," Jan. 1999, *Computer Vision and Image Understanding*, vol. 73, No. 1, pp. 82-98.

Moeslund, T. et al., "A Survey of Advances in Vision-Based Human Motion Capture and Analysis," Computer Vision and Image Understanding, 2006, vol. 104, pp. 90-126.

Mori, G. et al., "Recovering 3D Human Body Configurations Using Shape Contexts," *IEEE Transactions on Pattern Analysis and Machine Intelligence*, Jul. 2006, vol. 28 No. 7, pp. 1052-1062.

PCT International Search Report and Written Opinion, PCT Application No. PCT/US2010/020427, Mar. 2, 2010, seven pages.

Rehg, J. M. et al., "Model-based Tracking of Self-Occluding Articulated Objects," *Proceedings of the 5th International Conference on Computer Vision*, Jun. 20-23, 1995, pp. 612-617.

Shakhnarovich, G. et al., "Fast Pose Estimation with Parameter Sensitive Hashing," *9th IEEE International Conference on Computer Vision*, Oct. 13-16, 2003, pp. 750-757, Nice, France.

Siciliano, B. et al., "A General Framework for Managing Multiple Tasks in Highly Redundant Robotic Systems," *International Conference on Advanced Robotic*, 1991, vol. 2, pp. 1211-1216, Pisa, Italy.

Sidenbladh, H. et al., "Stochastic Tracking of 3D Human Figures Using 2D Image Motion," $6^{th}$ *European Conference on Computer Vision Proceedings*, Part II, Jun.-Jul. 2000, pp. 702-718, Dublin, Ireland.

Taylor, C. J., "Reconstruction of Articulated Objects from Point Correspondences in a Single Uncalibrated Image," *Computer Vision and Image Understanding*, Dec. 2000, vol. 80, Issue 3, pp. 349-363.

Wang, L. et al., "Recent Developments in Human Motion Analysis," *Pattern Recognition*, 2003, vol. 36 (3), pp. 585-601.

Zghal, H. et al., "Efficient Gradient Projection Optimization for Manipulators with Multiple Degrees of Redundancy," *International Conference on Robotics and Automation*, 1990, vol. 2, pp. 1006-1011.

United States Patent and Trademark Office, Non-Final Rejection, U.S. Appl. No. 12/709,287, Oct. 3, 2012, 22 pages.

Chen, Y., et al., "The Design of a Real-Time, Multimodal Biofeedback System for Stroke Patient Rehabilitation," Proceedings of the $14^{th}$ Annual ACM international Conference on Multimedia, pp. 763-772, Oct. 23-27, 2006.

Gopalan, R., et al., "Toward a vision based hand gesture interface for robotic grasping," IEEE/RSJ International Conference on Intelligent Robots and Systems, pp. 1452-1459, Oct. 11-15, 2009.

Holden, M.K., "Virtual Environments for Motor Rehabilitation: Review," CyberPsychology & Behavior, vol. 8, No. 3, pp. 187-219, Jun. 2005.

Holden, M.K., et al., "Design and Testing of a Telerehabilitation System for Motor Re-Training using a Virtual Environment," IEEE International Workshop on Virtual Rehabilitation, pp. 134-139, 2006.

Holden, M.K., et al., "Virtual-Environment-Based Telerehabilitation in Patients with Stroke," Presence, vol. 14, No. 2, pp. 214-233, Apr. 2005.

Huang, H., et al., "Recent developments in biofeedback for neuromotor rehabilitation," Journal of NeuroEngineering and Rehabilitation, vol. 3, pp. 1-12, Jun. 2006.

Kizony, R., et al., "Adapting an immersive virtual reality system for rehabilitation," The Journal of Visualization and Computer Animation, vol. 14, pp. 261-268, 2003.

Srinivasan, P., et al., "Bottom-up Recognition and Parsing of the Human Body," IEEE Conference on Computer Vision and Pattern Recognition, pp. 1-8, Jun. 17-22, 2007.

Sveistrup, H., et al., "Experimental Studies of Virtual Reality-Delivered Compared to Conventional Exercise Programs for Rehabilitation," CyberPsychology & Behavior, vol. 6, No. 3, pp. 245-249, 2003.

United States Patent and Trademark Office, Final Rejection, U.S. Appl. No. 12/317,369, Aug. 31, 2012, 21 pages.

United States Patent and Trademark Office, Non-final Rejection, U.S. Appl. No. 12/873,498, Jul. 16, 2012, 21 pages.

Wu, G., "Real-Time Feedback of Body Center of Gravity for Postural Training of Elderly Patients with Peripheral Neuropathy," IEEE Transactions on Rehabilitation Engineering, vol. 5, No. 4, pp. 399-402, Dec. 1997.

Yue, Z., et al., "Synthesis of Silhouettes and Visual Hull Reconstruction for Articulated Humans," IEEE Transactions on Multimedia, vol. 10, No. 8, pp. 1565-1577, Dec. 2008.

Zhu, Y., et al., "Controlled human pose estimation from depth image streams," IEEE Computer Society Conference on Computer Vision and Pattern Recognition Workshops, pp. 1-8, Jun. 23-28, 2008.

Delp, S.L. et al., "A Graphics-Based Software System to Develop and Analyze Models of Musculoskeletal Structures," Comput. Biol. Med., 1995, pp. 21-34, vol. 25, No. 1.

Malassiotis, S. et al., "A Gesture Recognition System Using 3D Data," Proceedings of the First *International Symposium on 3D Data Processing Visualization and Transmission*, Jun. 19-21, 2002, four pages, Padova, Italy.

Reinbolt, J. et al., "Are Patient-Specific Joint and Inertial Parameters Necessary for Accurate Inverse Dynamics Analyses of Gait?," *IEEE Transactions on Biomedical Engineering*, May 2007, pp. 782-793, vol. 54, No. 5.

U.S. Appl. No. 61/239,387, filed Sep. 2, 2009, Inventors: Sakagami et al.

U.S. Patent Office, Final Office Action, U.S. Appl. No. 12/873,498, Jan. 4, 2013, fifteen pages.

Yang, J. et al., "Two-Dimensional PCA: A New Approach to Appearance-Based Face Representation and Recognition," *IEEE Transactions on Pattern Analysis and Machine Intelligence*, Jan. 2004, pp. 131-137, vol. 26, No. 1.

Zhou, H. et al., "Human motion tracking for rehabilitation—A survey," *Biomedical Signal Processing and Control*, 2008, pp. 1-18, vol. 3.

United States Office Action, U.S. Appl. No. 12/317,369, Aug. 6, 2014, twenty-four pages.

\* cited by examiner

CONTROLLED HUMAN POSE ESTIMATION FROM DEPTH IMAGE STREAMS

RELATED APPLICATIONS

This application claims the benefit of U.S. Provisional Application No. 61/204,869, filed Jan. 9, 2009, the content of which is incorporated by reference herein in its entirety.

This application is also a continuation-in-part application of U.S. patent application Ser. No. 12/317,369, filed Dec. 19, 2008, which claims the benefit of U.S. Provisional Application No. 61/016,298, filed Dec. 21, 2007, both of which are incorporated by reference herein in their entirety.

This application is related to U.S. patent application Ser. No. 11/614,930, filed Dec. 21, 2006, titled "Reconstruction, Retargetting, Tracking, and Estimation of Motion for Articulated Systems", U.S. patent application Ser. No. 11/734,758, filed Apr. 12, 2007, titled "Control Of Robots From Human Motion Descriptors", U.S. patent application Ser. No. 12/258,184, filed Oct. 24, 2008, entitled "Real-Time Self Collision And Obstacle Avoidance Using Weighting Matrix", and U.S. patent application Ser. No. 12/257,664, filed Oct. 24, 2008, entitled "Real-Time Self Collision And Obstacle Advoidance", all of which are incorporated by reference herein in their entirety.

BACKGROUND

1. Field of Disclosure

The disclosure generally relates to the field of tracking motion of a system, and more specifically, to pose estimation from visual input.

2. Description of the Related Art

Recovering human pose from visual observations is a challenging problem in the field of computer vision because of the complexity of the models which relate observation with pose. An effective solution to this problem has many applications in areas such as video coding, visual surveillance, human gesture recognition, biomechanics, video indexing and retrieval, character animation, and man-machine interaction. See D. Gavrila, "The visual analysis of human movement: a survey", *Computer Vision and Image Understanding*, 73(1):82-98 (1999); see also L. Wang, W. Hu, and T. Tan, "Recent developments in human motion analysis" *Pattern Recog.*, 36(3): 585-601 (2003); see also T. B. Moeslund, A. Hilton, and V. Kruger, "A survey of advances in vision-based human motion capture and analysis", *Computer Vision and Image Understanding*, 104(2,3):90-126 (2006), all of which are incorporated by reference herein in their entirety.

One of the major difficulties in estimating pose from visual input involves the recovery of the large number of degrees of freedom in movements which are often subject to kinematic constraints such as joint limit avoidance, and self penetration avoidance between two body segments. Such difficulties are compounded with insufficient temporal or spatial resolution, ambiguities in the projection of human motion onto the image plane, and when a certain configuration creates self occlusions. Other challenges include the effects of varying illumination and therefore appearance, variations of appearance due to the subject's attire, required camera configuration, and real time performance for certain applications.

Traditionally there are two categories of approaches in solving the pose estimation problem, model based approaches and learning based approaches. Model-based approaches rely on an explicitly known parametric human model, and recover pose either by inverting the kinematics from known image feature points on each body segment (See C. Barron and I. A. Kakadiaris, "Estimating anthropometry and pose from a single image", *Computer Vision and Pattern Recognition*, 1:669-676 (2000); see also C. J. Taylor, "Reconstruction of articulated objects from point correspondences in a single uncalibrated image", *Computer Vision and Image Understanding*, 80(3):349-363 (2000), both of which are incorporated by reference herein in their entirety), or by searching high dimensional configuration spaces which is typically formulated deterministically as a nonlinear optimization problem (See J. M. Rehg and T. Kanade, "Model-based tracking of selfoccluding articulated objects", *ICCV*, pages 612-617 (1995), the content of which is incorporated by reference herein in its entirety), or probabilistically as a maximum likelihood problem (See H. Sidenbladh, M. J. Black, and D. J. Fleet, "Stochastic tracking of 3D human figures using 2D image motion", *ECCV*, pages 702-718, (2000), the content of which is incorporated by reference herein in its entirety). The model-based approaches typically require good initialization, high dimensional feature points, and are computationally intensive. In addition, the model-based approaches generally do not enforce bodily constraints such as joint limitation and self penetration avoidance, they often generate erroneous estimation results.

In contrast, learning based approaches directly estimate body pose from observable image quantities. See A. Agarwal and B. Triggs, "Recovering 3d human pose from monocular images", *IEEE Trans. on Pattern Analysis and Machine Intelligence*, 28(1):44-58 (2006), see also G. Mori and J. Malik, "Recovering 3d human body configurations using shape contexts", *IEEE Trans. on Pattern Analysis and Machine Intelligence*, 28(7): 1052-1062 (2006), both of which are incorporated by reference herein in their entirety. In example based learning, inferring pose is typically formulated as a k-nearest neighbors search problem where the input is matched to a database of training examples whose three-dimensional (3D) pose is known. Computational complexity of performing similarity search in high dimensional spaces and on very large data sets has limited the applicability of these approaches. Although faster approximate similarity search algorithms have been developed based on Locally-Sensitive Hashing, computation speed remains a challenge with learning based approaches. See G. Shakhnarovich, P. Viola, and T. Darrell, "Fast pose estimation with parameter sensitive hashing", *ICCV*, 2:750-757 (2003), the content of which is incorporated by reference herein in its entirety. Similar to the model based approaches, the learning based approaches also tend to be computationally intensive. In addition, in order for a pose to be properly recognized using a learning based approach, a system must process ("learn") the pose before hand. Thus, generally only a small set of pre-programmed human pose can be recognized using the learning based approaches.

Hence, there is lacking, inter alia, a system and method for efficiently and accurately estimating human pose in real time.

SUMMARY

Embodiments of the present invention provide a method (and corresponding system and computer program product) for pose estimation of human actors. According to one aspect, anatomical features are detected in a depth image of the human actor. The method detects a head, neck, and trunk (H-N-T) template in the depth image, and detects limbs in the depth image based on the H-N-T template. The anatomical features are detected based on the H-N-T template and the limbs. An estimated pose of a human model is estimated based on the detected features and kinematic constraints of the human model.

According to another aspect, the method detects limbs of the human actor in the depth image through skeleton analysis and distance transformation. If self occlusion is determined present in the depth image, the method attempts to detect an open limb region and/or a loop region in a distance transformed skeleton image, and conducts depth slicing analysis to detect a limb region occluding the H-N-T template.

According to still another aspect, the method determines a label of a detected limb region by calculating a probability for each pixel of the region for a likelihood of the pixel belonging to a particular limb of the human actor. The method calculates the probability based on (1) previously generated predicted limb poses and (2) previous occlusion states of the limbs. The method also determines an occlusion state of the limb region based on the calculated probabilities of its pixels.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

The present invention provides a system (and corresponding method and computer program product) for estimating poses of a motion generator in real time. The system detects key features in visual input of the generator, and reconstructs the pose of the generator on a model based on the detected features. The system also makes predictions of feature positions and utilizes the predictions to resolve ambiguities when multiple feature candidates are detected, and to estimate intermittently missing or occluded features.

For the sake of illustration, without loss of generality, this description assumes that the motion generator is a human actor and the model represents a human model that is configured based on a structure of the human actor to resemble a body pose of the human actor. Those of skill in the art will recognize that the techniques described herein can be utilized to estimate poses of other motion generators such as animals, for example.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1:
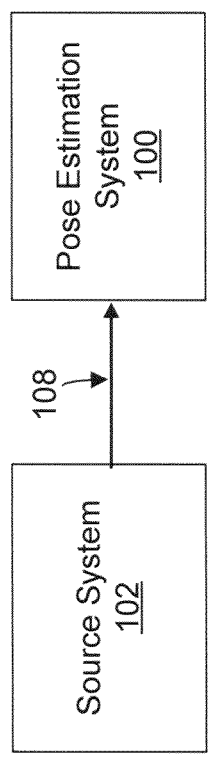
FIG. 1 is a block diagram illustrating a pose estimation system for estimating pose of a motion generator in a source system in accordance with one embodiment of the invention.

FIG. 1 is a block diagram illustrating a pose estimation system 100 for estimating poses of a human actor in a source system 102. The source system 102 generates a series of visual images of the human actor and transmits them to the pose estimation system 100 in an image stream 108. In one embodiment, the source system 102 utilizes a camera such as a time-of-flight camera (also called a TOF camera, a time-of-flight range image sensor) to continuously capture poses of the human actor and transmits a depth image stream 108 to the pose estimation system 100. The pose estimation system 100 detects key features in the received image stream 108 and reconstructs the human actor's pose in a human model.

In addition to or instead of providing human pose estimation, the pose estimation system 100 may be used for other purposes such as motion retargeting, tracking and estimation, and joint torque estimation in biomechanics. In motion retargeting, the pose estimation system 100 generates motion descriptors of the source system 102 based on the reconstructed poses, and transmits the motion descriptors to a motion retargeting system, which generates joint variables for controlling the motion of a target system to simulate the motion in the source system 102. Further information of motion retargeting is found in U.S. application Ser. No. 11/734,758, filed Apr. 12, 2007, titled "Control Of Robots From Human Motion Descriptors", the content of which is incorporated by reference herein in its entirety.

System Architecture

Figure 2:
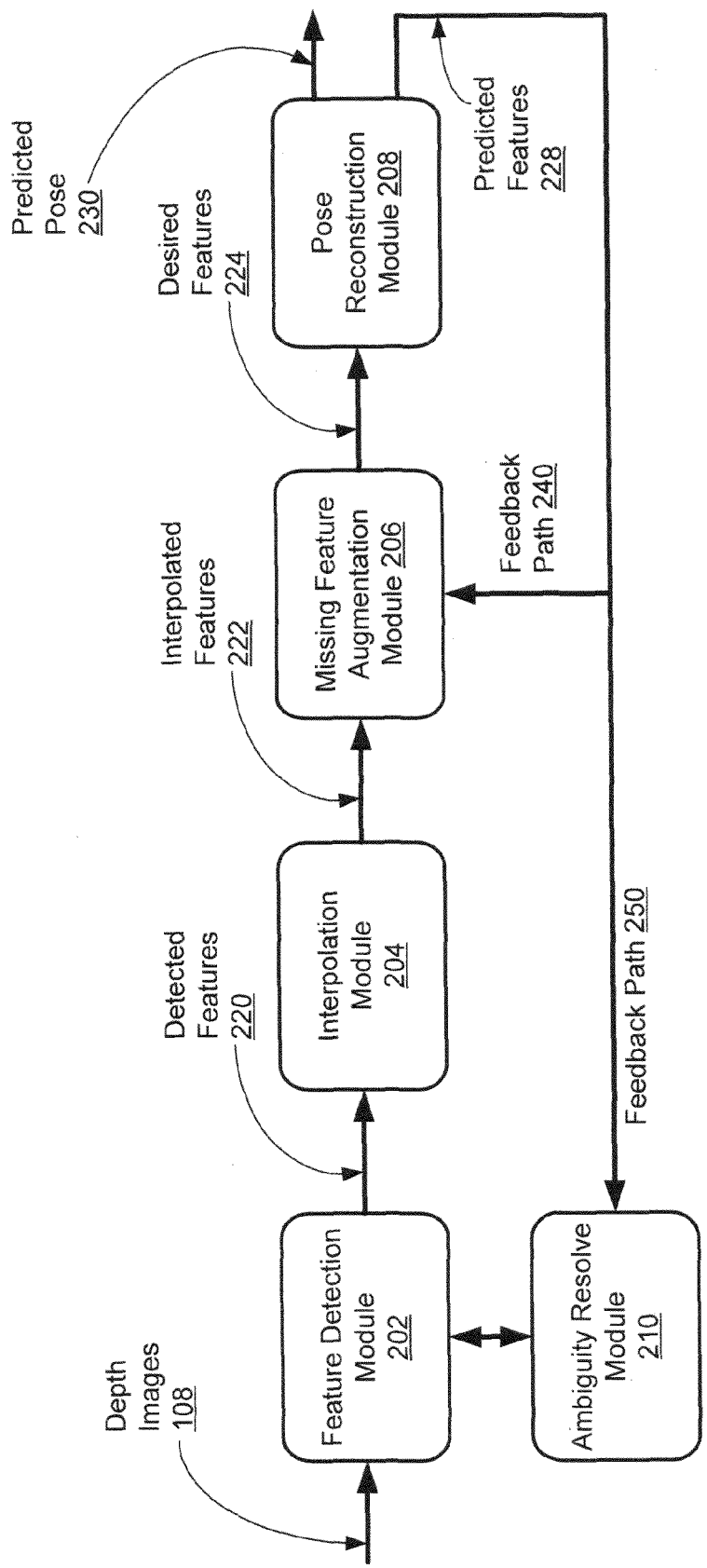
FIG. 2 is a block diagram illustrating a configuration of the pose estimation system shown in FIG. 1 in accordance with one embodiment of the invention.
Figure 5A:
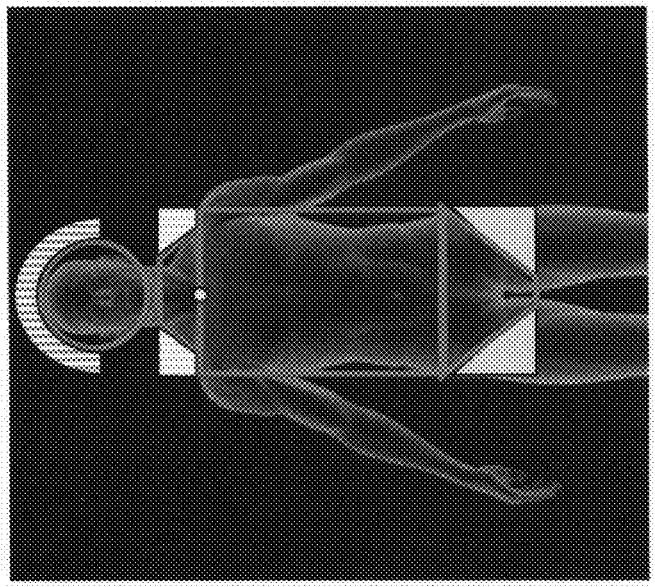
FIGS. 5A-B are diagrams illustrating a human model in accordance with one embodiment of the invention.

FIG. 2 is a block diagram illustrating a configuration of the pose estimation system 100 for estimating body poses according to one embodiment. The pose estimation system 100 reconstructs body poses of a human actor from multiple features detected in the depth image stream 108. The features (or feature points, anatomical features, key points) correspond to 3D positions of prominent anatomical landmarks on the human body. Without loss of generality, the pose estimation system 100 tracks fourteen ($k=14$) such body features as illustrated in FIG. 5A. As shown, the fourteen features are head center, left shoulder, right shoulder, left elbow, right elbow, left wrist, right wrist, waist, left hip, right hip, left knee, right knee, left ankle, and right ankle. The reconstructed (or estimated) human pose q is described in the human model that tracks the human actor's pose. In one embodiment, the human model is a human anatomical model that closely resembles the body of the human actor.

As shown in FIG. 2, the pose estimation system 100 comprises a feature detection module (also called a key-point detection module) 202, an interpolation module 204, a missing feature augmentation module 206, a pose reconstruction module (also called a constrained closed loop inverse kinematics module) 208, and an ambiguity resolve module 210.

The feature detection module 202 is configured to receive the depth image stream 108, detect features in the depth image stream 108, and output the detection results. Due to occlusions, unreliable observations, or low confidence in the detection results, the actual number of detected features for a particular image frame, denoted by m (m= . . . k), may be fewer than k. The detected features are represented by a position vector $p_{det}$ 220, which is formed by concatenating the 3D position vectors corresponding to the individual detected features. As described in detail below with relate to FIG. 4A, the feature detection module 202 first detects a head, neck, and trunk (H-N-T) template and limbs, and then localizes the features based on the detected H-N-T template and limbs.

The interpolation module 204 is configured to low pass filter the vector $p_{det}$ 220 received from the feature detection module 202 and generate interpolated features $\bar{p}_{det}$ 222. In one embodiment, the depth images transmitted to the pose estimation system 100 is captured at approximately 15 frames per second using a TOF camera (e.g., a Swiss Ranger SR-3000 3D time of flight camera). For stability in numerical integrations performed in the pose reconstruction module 208 in subsequent modules, the interpolation module 204 re-samples the detected features to a higher rate (e.g., 100 HZ) and represented by the vector $\bar{p}_{det}$ 222.

The missing feature augmentation module 206 is configured to augment $\bar{p}_{det}$ with positions of features missing in the depth image stream 108 and generate desired (or augmented) feature vector, denoted by $p_d$ 224. As noted above, the number of detected features at each frame may be fewer than fourteen (i.e. m<k=14) due to occlusions or unreliable observations. The missing feature augmentation module 206 receives the predicted features p 228 from the pose reconstruction module 208 through a feedback path 240 and utilizes p 228 to augment the missing features. The augmented features $p_d$ 224 represents the k=14 desired features used as input to the pose reconstruction module 208.

The pose reconstruction module 208 is configured to generate estimated poses q 230 and predicted features p 228 based on $p_d$ 224, the accurate human model, and its constraints. The pose reconstruction module 208 is further configured to transmit p 228 to the missing feature augmentation module 206 and the ambiguity resolve module 210 to resolve subsequent ambiguities and to estimate intermittently missing or occluded features. The estimated (or reconstructed, recovered) pose, parameterized by the vector q 230, describes the predicted motion and pose of all n degrees of freedom in the human model. The predicted features p 228 are fed-back to the missing feature augmentation module 206 to augment intermittently missing or occluded features, and to the ambiguity resolve module 210 to resolve ambiguities in case multiple feature candidates are detected.

The ambiguity resolve module 210 is configured to resolve ambiguities when the feature detection module 202 detects multiple possible feature candidates. The ambiguity resolve module 210 receives the predicted features p 228 from the pose reconstruction module 208 through a feedback path 250 and utilizes p 228 to resolve the ambiguities. For example, p 228 may indicate that the hypothesized location of one candidate for a feature (i.e., from the feature detection module 202) is highly improbable, causing the ambiguity resolve module 210 to select another candidate of the feature as the detected feature. As another example, the ambiguity resolve module 210 may choose the feature candidate that is closest to the corresponding predicted feature to be the detected feature. Alternatively or additionally, the ambiguity resolve module 210 may use the predicted feature as the detected feature.

The pose estimation system 100, or any of its components described above, may be configured as software (e.g., modules that comprise instructions executable by a processor), hardware (e.g., an application specific integrated circuit), or a combination thereof. The software and/or hardware may operate in a computer system that is structured to include a processor, memory, computer-readable storage medium (e.g., hard drive), network interfaces, and applicable operating system and other functional software (e.g., network drivers, communication protocols). Those of skill in the art will recognize that other embodiments can have different and/or additional modules than those shown in FIG. 2. Likewise, the functionalities can be distributed among the modules in a manner different than described herein. Further, some of the functions can be provided by entities other than the pose estimation system 100.

System Operation

Figure 3:
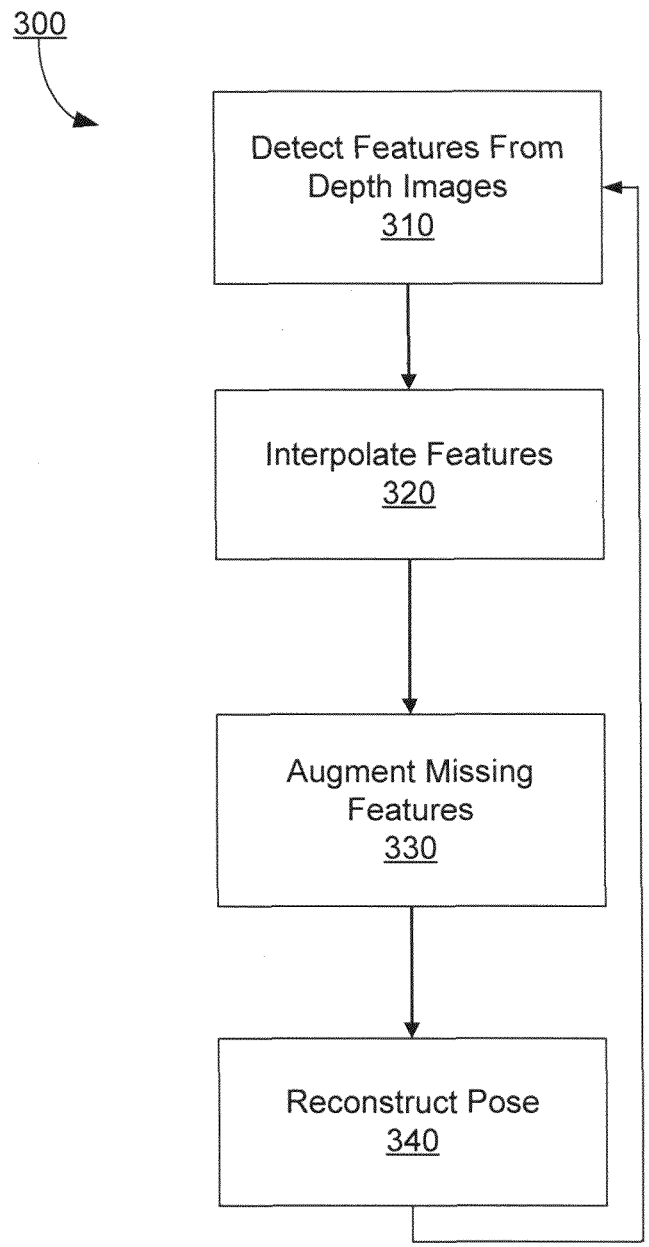
FIG. 3 is a flow diagram illustrating a pose estimation process in accordance with one embodiment of the invention.

FIG. 3 is a flowchart illustrating an example process of the pose estimation system 100 for estimating human body pose in accordance with one embodiment of the invention.

The pose estimation system 100 (or the feature detection module 202) detects 310 body features of the human actor in the depth image stream 108. In one embodiment, the pose estimation system 100 detects 310 the features by first detecting a head, neck, and trunk (H-N-T) deformable template and limbs, and then localizing the features based on the detected H-N-T template and limbs. The process to detect 310 the features are described in further detail below with relate to FIG. 4A. When multiple feature candidates are detected, the pose estimation system 100 utilizes the previously generated predicted features p to resolve ambiguities.

The pose estimation system 100 (or the interpolation module 204) interpolates 320 the detected features $p_{det}$ to re-sample the data to a higher rate (e.g., 100 Hz). In one embodiment, the pose estimation system 100 interpolates 320 the detected features using a local cubic spline interpolation routine. The interpolation is performed to ensure stability of numerical integrations performed in the pose reconstruction module 208. In one embodiment, the pose estimation system 100 low-pass filters the detected features Pdet before interpolating the filtered features.

The pose estimation system 100 (or the missing feature augmentation module 206) augments 330 the interpolated features $\bar{p}_{det}$ with positions of undetected features and generate augmented feature vector $p_d$. As noted above, the pose estimation system 100 may detect less than fourteen body features at each frame due to occlusions or unreliable observations. The pose estimation system 100 estimates those undetected features using previously generated predicted features p. If m<k, the detected features are augmented with (k−m) predicted features p obtained from forward kinematics computations of the reconstructed pose.

The pose estimation system 100 (or the pose reconstruction module 208) reconstructs 340 the observed body pose q of the human actor in a human model and predicts subsequent features (or feature point positions) p. The predicted position of each feature is described by the vector $p_i$ and referenced to a base frame corresponding to a waist joint coordinate system. In one embodiment, the pose estimation system 100 reconstructs 340 human pose by tracking the observed features and prioritizing features according to their importance or level of confidence. The pose estimation system 100 predicts subsequent features by enforcing kinematic constraints of the human model, such as joint limitations and self penetration avoidance.

The pose estimation system 100 expresses the observed and predicted features in Cartesian space. These features do not necessarily define the degrees of freedom required to fully describe the motion of the human model. For an n degree of freedom human model, the configuration space, or joint space, described here by vector $q=[q_1, \ldots, q_n]^T$ fully characterizes the motion of the human model. The mapping between configuration space velocities and Cartesian space velocities is obtained by considering the differential kinematics relating the two spaces, $$\dot{p}_i = J_i(q)\dot{q} \quad (1)$$

where $J_i \in \Re^{3 \times n}$ is the Jacobian of the $i_{th}$ feature and $\dot{p}_i$ is the velocity of $p_i$. See J. J. Craig, "Introduction to robotics, mechanics and control", *Addison-Wesley*, 2nd edition (1989), the content of which is incorporated by reference herein in its entirety.

One or more portions of the method 300 may be implemented in embodiments of hardware and/or software or combinations thereof. For example, the method 300 may be embodied through instructions for performing the actions described herein and such instrumentations can be stored within a tangible computer readable medium (e.g., flash memory, RAM, nonvolatile magnetic storage device) and are executable by a computer processor. Furthermore, those of skill in the art will recognize that other embodiments can perform the steps of the method 300 in different order. Moreover, other embodiments can include different and/or additional steps than the ones described here. The pose estimation system 100 can perform multiple instances of the steps of method 300 concurrently and/or perform steps in parallel.

Feature Detection and Tracking

Figure 4A:
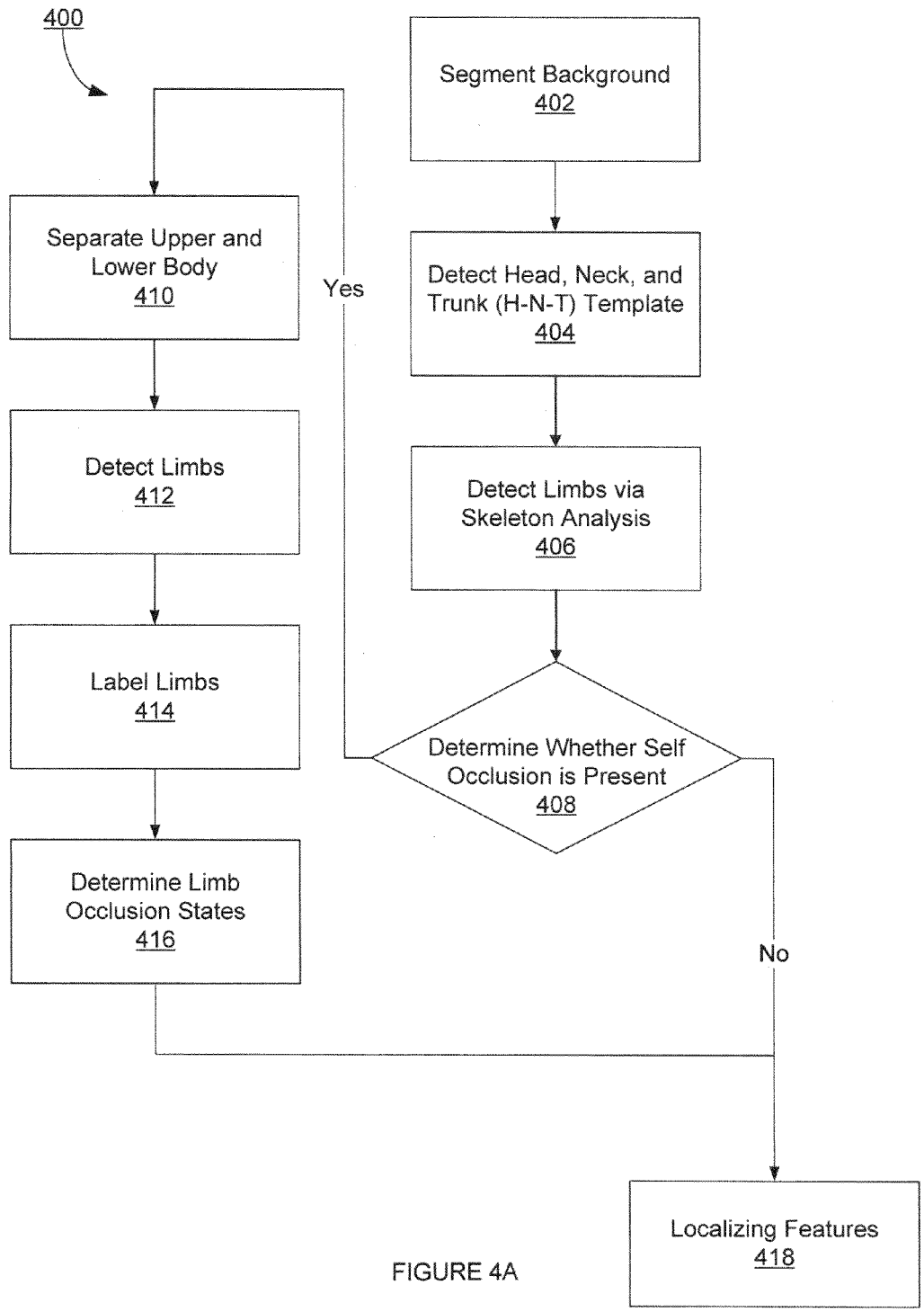
FIGS. 4A-C are flow diagrams collectively illustrating a feature detection process in accordance with one embodiment of the invention.

Referring to FIG. 4A, a flow diagram describing a process 400 of the pose estimation system 100 (or the feature detection module 202) for detecting and tracking body features in a depth image stream in accordance with one embodiment of the invention. As shown, the pose estimation system 100 segments 402 the background from the human figure, and detects 404 a head, neck and trunk template in the depth image stream. The pose estimation system 100 detects 406 limbs in the depth images via skeleton analysis, and determines 408 whether self occlusion is present. If self occlusion is present, the pose estimation system 100 separates 410 upper and lower body, detects 412 and labels 414 limbs, and determines 416 limb occlusion states. The pose estimation system 100 completes the process 400 by localizing 418 the detected features. The steps of the process 400 are described in further detail below with relate to FIGS. 4B-C, 5A-B, 6A-B, and 7A-E. Even though the described process 400 detects body features in a depth image stream, one skilled in the art will readily recognize from the following description that alternative embodiments of the process may detects body features in other types of image streams, such as a regular two dimensional image stream, without departing from the principles described herein.

Background Segmentation

The pose estimation system 100 separates image regions of the human figure (also called the foreground) from image regions of the background through the background segmentation process 402. Examples of the background clutters to be separated from the foreground include the floor and other objects that are beyond the depth working volume.

According to one embodiment, the foreground is assumed to occupy a depth volume of interest (or the depth working volume) which is set to $[0, Z_{max})$. The pose estimation system 100 identifies image coordinates with depth values that lie outside this volume of interest (i.e., $[Z_{max}, \infty]$) as background. The pose estimation system 100 can also perform morphological operations to remove salt-and-pepper noise during this process.

According to one embodiment, the floor is assumed to occupy the image regions where depth image normal vectors point proximately in the vertical direction. The pose estimation system 100 segments 402 the floor from the foreground by first estimating normal vectors at each pixel in the depth image and then segmenting 402 those image coordinates with vertical normal vectors. The pose estimation system 100 can take into account margin for error due to noise during this process.

The pose estimation system 100 obtains the image of the foreground by removing the image of the background identified above from the depth image stream.

Head, Neck and Trunk Detection

Figure 5B:
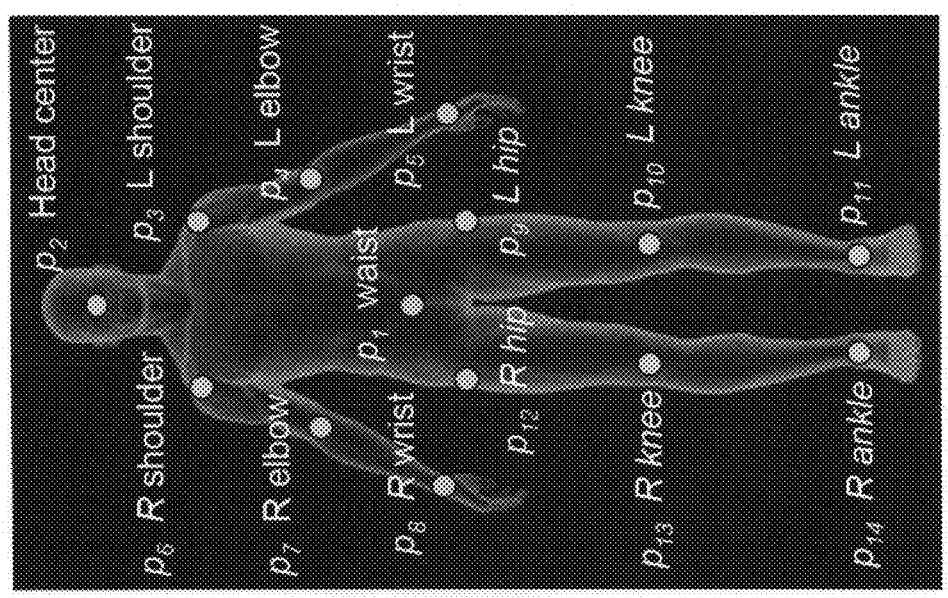

The pose estimation system 100 detects and tracks 404 the head, the neck, and the trunk of the human actor using a head-neck-trunk (H-N-T) deformable template. The trunk includes the torso and the waist. As shown in FIG. 5B, the H-N-T template depicts the head, the neck, the torso, and the waist by a circle, a trapezoid, a rectangle, and another trapezoid, respectively.

The head circle template is parameterized by $H=\{x_{HO}, y_{HO}, r_0\}$, where $r_0$ represents the radius of the head circle template and $(x_{HO}, y_{HO})$ are the head center coordinates. The torso is represented as a rectangular box with parameters $T=\{x_T, y_T, w_T, h_T, \alpha\}$, where $w_T$ and $h_T$ represent the width and height of the torso box, respectively, $\alpha$ describes the inclination angle of the torso in the image plane relative to the upright posture, and $(x_T, y_T)$ are the frontal (image) plane coordinates at the midpoint of the top edge in the torso box. The neck template is represented as a trapezoid, rigidly attached to the torso box as shown in FIG. 5B. The neck trapezoid is parameterized by $N=\{x_T, y_T, w_{N1}, w_{N2}, h_N, \alpha\}$, where $w_{N1}$ and $w_{N2}$ correspond to the width of the upper and lower trapezoid edges, respectively, and $h_N$ represents the height of the neck. The waist template is represented as a trapezoid connected to the torso box with a rotation joint. The waist template is parameterized by $W=\{x_W, y_W, w_{W1}, w_{W2}, h_W, \beta\}$. The position of the waist joint $(x_W, y_W)$ is located at the midpoint of the bottom edge in the torso box. The parameters $w_{W1}, w_{W2}$, and $h_W$ are the top width, bottom width, and height of the waist trapezoid, and $\beta$ describes the rotation angle of the waist relative to the torso.

The relative edge lengths of the H-N-T template are obtained based on anthropometric studies reported in the biomechanics literature, which report body segment measurements as a fraction of the total body height. See D. A. Winter, "Biomechanics and Motor Control of Human Movement", *Wiley-Interscience*, New York (1990), the content of which is incorporated by reference herein in its entirety.

Let $L=\{H, N, T, W\}$ denotes a configuration of the H-N-T template that localizes the head circle, the neck trapezoid, the torso rectangle, and the waist trapezoid. Let $\theta$ be a set of distribution parameters used to define the H-N-T template, $$\theta = \{\lambda_1, \ldots, \lambda_1, (\mu_1, \sigma_1), \ldots (\mu_4, \sigma_4)\}. \quad (2)$$

As will be described shortly, $\lambda_i (i=1, \ldots, 7)$ correspond to parameters in a function describing the likelihood of detecting the H-N-T template, and $(\mu_i, \sigma_i)$ $(i=1, \ldots, 4)$ are the means and standard deviations in the associated prior distribution functions. These parameters are learned by collecting training examples from image processing operations and distribution functions given below.

Let $P(I|L, \theta)$ be the likelihood function measured from the image observations, and let $P(L|\theta)$ be the prior probability of the H-N-T configuration. From Bayes' rule, the posterior distribution $P(I|L, \theta)$ can be defined as, $$P(L|I,\theta) \propto P(I|L,\theta)P(L|\theta). \tag{3}$$

Assuming the image likelihood functions for the H-N-T parameters are independent, it follows that $$P(I|L,\theta) = P(I|H)P(I|N)P(I|T)P(I|W). \tag{4}$$

The prior distribution over H, N, T, and W includes:

$$P(L|\theta) = P(r_0|\theta)P(\overline{\omega}_T|\theta)P(h_T|\theta)P(c|\theta), \tag{5}$$

where c is the distance from the head center to the top edge midpoint of the neck trapezoid. The detected H-N-T template is either accepted or rejected based on the following criterion imposed on the likelihood function, $$L(H, N, T, W) = \begin{cases} \text{accepted} & \text{if } \log(P(L|I, \theta)) > thr \\ \text{rejected} & \text{otherwise,} \end{cases} \tag{6}$$

where the threshold (thr) is determined empirically during training by computing the likelihood function L for multiple frames (e.g., hundreds) and observing the H-N-T template detection results.

A distribution function $P(I|H) = e^{-\lambda_1 N_{10H} - \lambda_2 N_{01H}}$ is used for the head likelihood function, where $N_{10H}$ and $N_{01H}$ represent the number of false negative pixels and false positive pixels, respectively. More precisely, $N_{10H}$ is the number of background pixels in the head circle, and $N_{01H}$ is the number of foreground pixels in the buffered head boundary (striped region above the head in FIG. 5B). Similarly, a distribution function $P(I|N) = e^{-80 \cdot 3 N_{10N} - \lambda_4 N_{01N}}$ is used for the neck likelihood function, where $N_{10N}$ is the number of background pixels in the neck trapezoid, and $N_{01N}$ is the number of foreground pixels in the buffered neck boundary (striped region on the right and left side of the neck template in FIG. 5B). A distribution function $P(I|T) = e^{-\lambda_5 N_{10T}}$ is used for the torso likelihood function, where $N_{10T}$ is the number of background pixels in the torso box. Note that the false positive pixels are not considered since the arms frequently occlude the torso box. A distribution function $P(I|W) = e^{-\lambda_6 N_{10W} - \lambda_7 N_{01W}}$ is used for the waist likelihood function, where $N_{10W}$ is the number of background pixels in the waist trapezoid, and $N_{01W}$ is the number of background pixels in the buffered waist boundary (striped region on the right and left side of the waist template in FIG. 5B). Finally, the prior distributions are assumed to be a normally distributed Gaussian distribution ($\eta$) with mean $\mu$ and standard deviation $\sigma$. The likelihood functions of H, N, T, and W are follows, $$P(r_0, \theta) = \eta(\mu_1, \sigma_1), \tag{7}$$

$$P(\overline{\omega}_T, \theta) = \eta(\mu_2, \sigma_2), \tag{8}$$

$$P(h_T, \theta) = \eta(\mu_3, \sigma_3), \tag{9}$$

$$P(c, \theta) = \eta(\mu_4, \sigma_4). \tag{10}$$

Figure 4B:
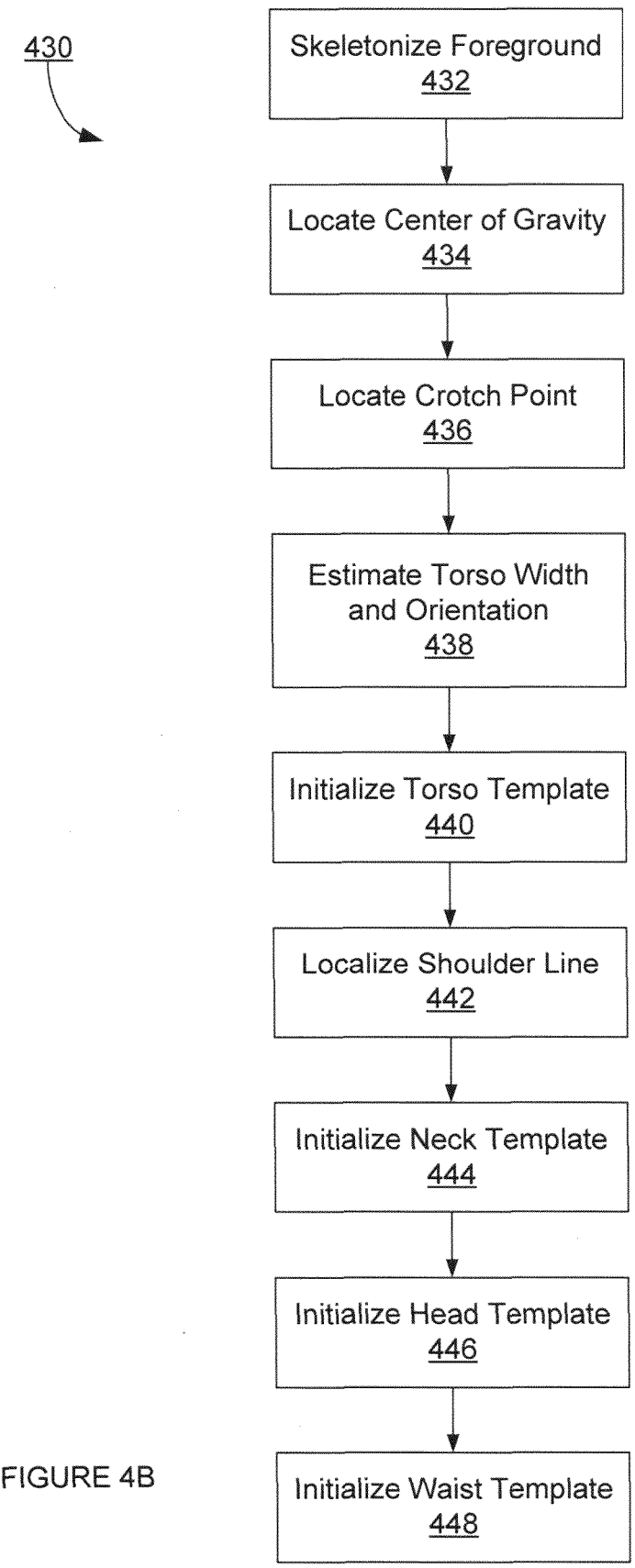
Figure 7A:
FIGS. 7A-E are diagrams showing results of human body pose estimation in accordance with one embodiment of the invention.

FIG. 4B is a flow diagram describing a process 430 of the pose estimation system 100 for localizing the initial optimal H-N-T template configuration in a depth image stream in accordance with one embodiment of the invention. As shown, the pose estimation system 100 first skeletonizes 432 the detected human figure (the foreground). Skeletonization is a morphological operation used for thinning the foreground pixel while preserving connectivity. The pose estimation system 100 locates 434 the center of gravity (COG) of the human figure by determining the centroid of all the pixels on the skeletonized human figure. The pose estimation system 100 then locates 436 the crotch point (also called crotch line) of the human figure as the point where the two legs branch off from the torso on the skeletonized human figure. The crotch point is also defined as the lowest waist point (also called waist line). The pose estimation system 100 estimates 438 the width and orientation of the torso by scanning multiple (e.g., hundreds) oriented line segments that pass the COG and are located inside the foreground. The pose estimation system 100 estimates 438 the torso width and orientation from the oriented line segment having the minimal length. COG and torso orientation together define the major torso axis. The pose estimation system 100 initializes 440 the torso template based on the major torso axis and the estimated torso width. The pose estimation system 100 localizes 442 a shoulder line by scanning line segments perpendicular to the major axis upward starting from COG until finding such a line segment with length shorter than 90% of the estimated torso width. The pose estimation system 100 uses the above trunk information to initialize 444 the neck template at the middle of the shoulder line with its orientation defined based on the torso's major axis. The pose estimation system 100 initializes 446 the head template based on its relative distance to the neck, and initializes 448 the waist template based on its relative height to the torso height. FIG. 7A includes depth image frames with H-N-T templates detected using the process 430. In one embodiment, to initialize the process 430, the human actor initially assumes an open arm configuration as illustrated in FIG. 5B.

During subsequent tracking, the pose estimation system 100 generates H-N-T configuration hypotheses both from the process 430 and locally sampled H-N-T configurations based on the tracked configuration from the most recent depth image frame.

Limb Detection From Skeleton Analysis

Referring back to FIG. 4A, once the pose estimation system 100 detects 404 the H-N-T template in a depth image frame, the pose estimation system 100 detects 406 limbs (i.e., two arms and two legs) in the skeleton image (or skeleton representation) of the depth image frame. When there is no self occlusion (i.e., occlusions among the H-N-T template and the limbs), in principle, the skeleton image of a depth image frame should contain five end-points, corresponding to two feet, two hands, and the head. In reality, certain poses may present artifacts or ambiguities in the skeleton image, where it is difficult to discern if an observed end-point is in fact an actual end-point. To address this issue, the pose estimation system 100 processes the skeleton image further by performing distance transformation to generate the corresponding distance transformed skeleton image. End-points must have distance values larger than a minimum value which is determined from anthropometric data. The pose estimation system 100 uses this constraint to eliminate spurious artifacts (i.e., wrong limb candidates).

The pose estimation system 100 detects the end points in the distance transformed skeleton image (or the skeleton image) by selecting a start point $p_S$ in the image and tracking the point along branches of the distance transformed skeleton image (or the skeleton image) until visited all end-points of the image. The start point can be any point in the skeletonized foreground. In one example, the point that is nearest to the COG is selected as the start point $p_S$. Once an end point is detected, the pose estimation system 100 can detect and localize the corresponding limb by forming a limb template that traces back from the end point along the skeleton until the torso template is reached. The pose estimation system 100 can also label the detected limbs based on which side of the body the limb is located. The end point corresponding to the head can be identified and localized using the center of the head template.

Figure 7B:
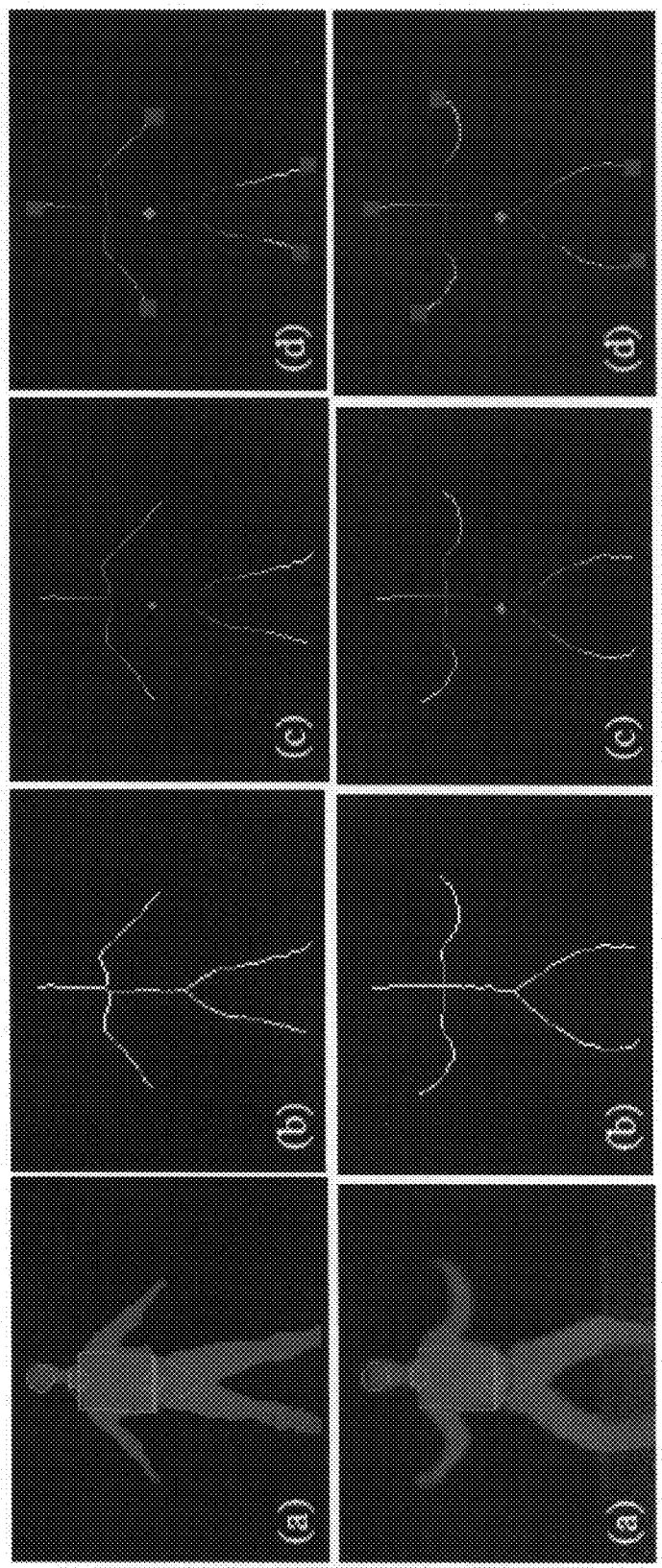

FIG. 7B includes images showing the process of using skeleton analysis to detect limbs in two example depth image frames. For each of the two examples, FIG. 7B shows, from left to right, the foreground images I (FIG. 7B(a)), the corresponding skeleton images $I_S$ (FIG. 7B(b)), the corresponding distance transformed skeleton images $I_D$ (FIG. 7B(c))), and $I_D$ with major end points marked (FIG. 7B(d)). As shown, the pose estimation system 100 selects the point that is nearest to the COG as the start point $p_S$ in $I_D$ (the red dot in FIG. 7B(c) and (d)), and traces along the image to detect the end-points (the blue dots in FIG. 7B(d)).

The process described above can be used to detect and localize limbs in a class of poses where there is no self occlusion, such as the two poses illustrated in FIG. 7B(a). Such poses are referred to as non-occluding configurations (NOC) in the following description.

Determine the Presence of Self Occlusion

As described above, the skeleton analysis process is sufficient to detect limbs in NOC, but not when self occlusion is present in the depth image. In order to determine whether additional analysis is necessary to detect limbs, the pose estimation system 100 determines 408 whether self occlusion is present in the current depth image frame.

In one embodiment, the pose estimation system 100 makes the determination 408 by examining the following two conditions. First, whether the pose estimation system 100 detected 406 four visible end points corresponding to the hands and feet. Second, whether the lengths of the skeletonized branches between the hand end points and corresponding entry points of the H-N-T template in the distance transformed skeleton image exceed a minimum distance. This minimum distance can be obtained from anthropometric data of arm and leg lengths. If both conditions are satisfied (i.e., 4 end-points are detected 406 and branch lengths exceed the minimum distance), the pose estimation system 100 determines 408 that no self occlusion is present (i.e., the configuration is a NOC), and otherwise the pose estimation system 100 determines 408 that self occlusion is present.

It is noted that when there is loop closure at the end-points, such as when the hands are over the head and touch each other, the pose estimation system 100 will determine 408 that self occlusion is present (because the pose estimation system 100 cannot detect 406 four limb end-points in this case).

Localize Feature Points

If the pose estimation system 100 determines 408 that no self occlusion is present and that the present configuration is a NOC, the skeleton analysis is sufficient for the pose estimation system 100 to localize 418 all fourteen features in the depth image. According to one embodiment, the pose estimation system 100 localizes 418 the head center feature as the center of the head template. The left and right shoulder and hip features are localized 418 using the corresponding limbs' entry points to the H-N-T template, respectively, along the distance transformed image. The elbow and knee features are localized 418 from the intersection points of the corresponding upper arm and lower arm, and corresponding upper leg and lower leg, respectively. Finally, the waist feature is localized 418 at the origin of the waist template.

Separate Upper and Lower Body

As described above, when human body configurations exhibit self occlusions, skeleton analysis alone is not enough to detect and localize limbs. Therefore, if self occlusions (or loop closures) are present, the pose estimation system 100 conducts further processing to detect limbs and the associated features.

In one embodiment, the pose estimation system 100 limits interactions between upper and lower body limbs, and treats the detection, tracking, and labeling of the upper-body and lower body limbs independently. Accordingly, to handle self occluded configurations, the pose estimation system 100 first separates 410 the upper and lower body of the foreground. For example, the pose estimation system 100 can make the separation 410 along the waist line. That is, portions of the configuration above the waist line are considered upper body and portions below are considered lower body.

Limb Detection

The pose estimation system 100 detects 412 limbs in occluded configurations (or self occlusion configurations) by conducting additional analysis. The additional analysis is described in detail below with relation to FIG. 4C for detecting 412 the upper body limbs (i.e., arms), while the lower body limbs can be detected 412 through a similar process.

Figure 4C:
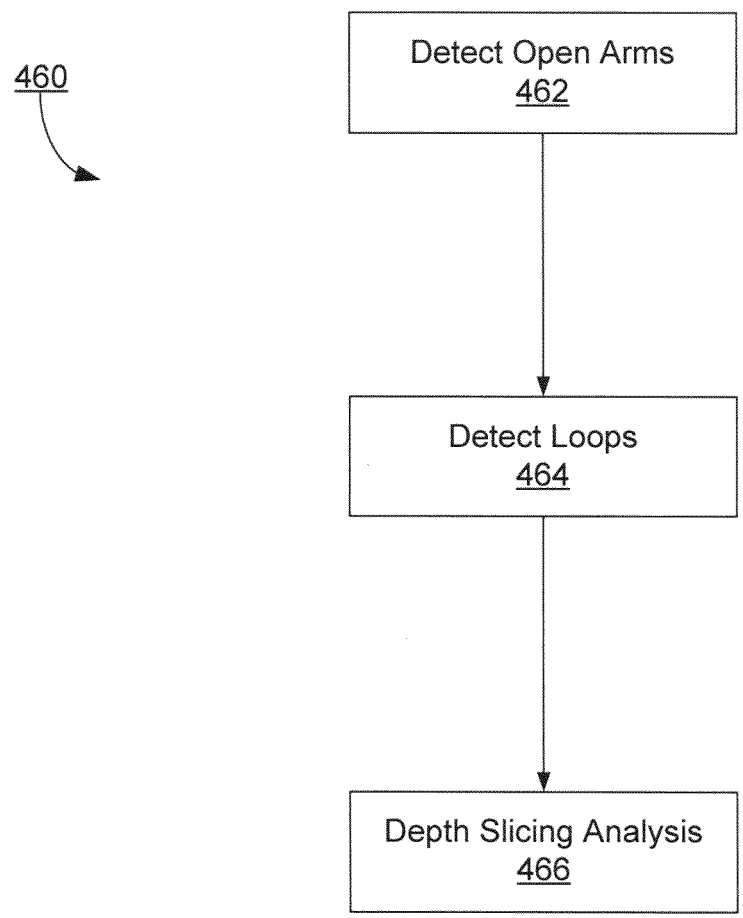

As shown in FIG. 4C, the pose estimation system 100 performs (sequentially or in parallel) the following three steps to identify image regions corresponding to arms, denoted by $I_{Arms}$: detecting 462 open arms on skeleton image ($I_S$) or distance transformed skeleton image ($I_D$), detecting 464 loops on $I_S$ (or $I_D$), and conducting 466 depth slicing analysis. These steps correspond to poses in which an arm is found beside the trunk (open arm), an arm is forming a loop along with the torso, and an arm is found in front of the trunk (depth slicing), accordingly.

Figure 7C:
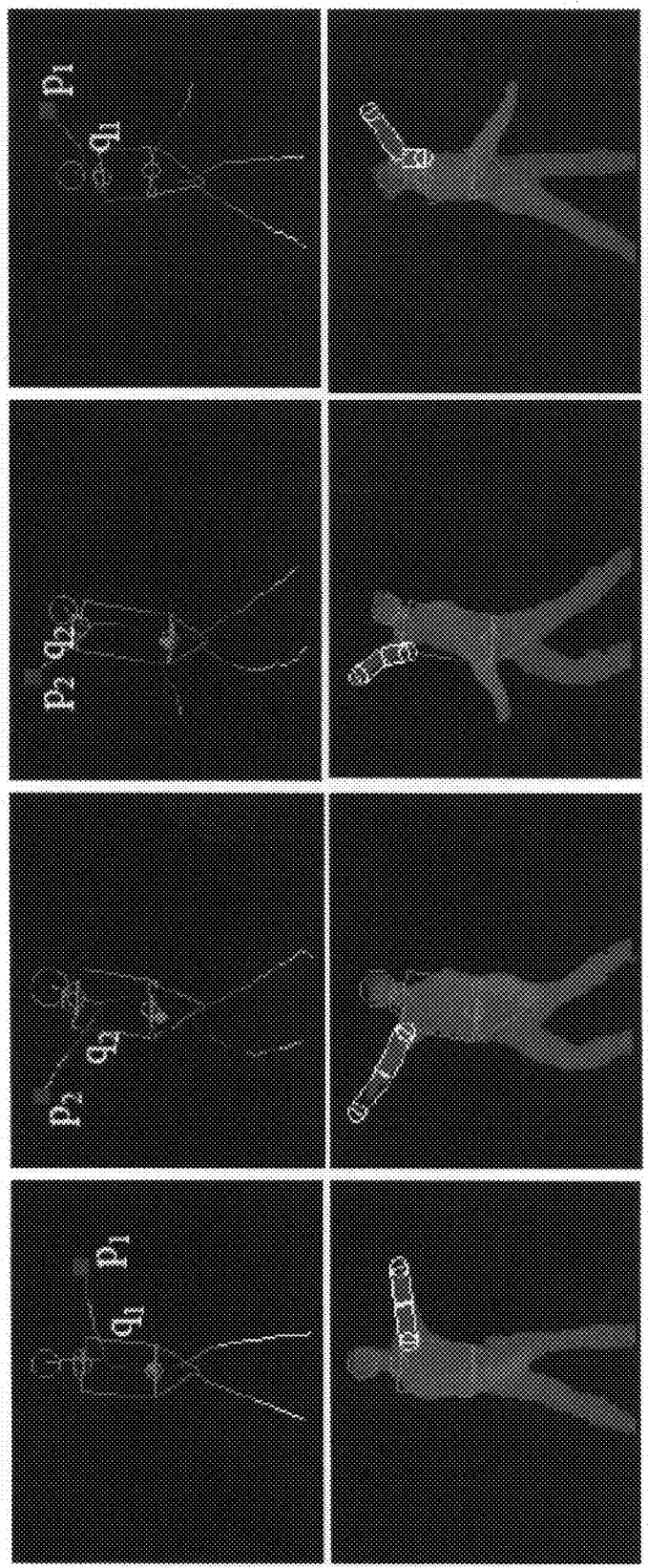

In order to detect 462 an open arm, the pose estimation system 100 detects a segment $p_i q_i$ for the open arm where $p_i$ is the end point and $q_i$ is the entry point that is connected to the H-N-T template. If the length of the segment $p_i q_i$ is longer than a threshold value and the entry point $q_i$ is within the shoulder region of the trunk, the pose estimation system 100 detects the segment $p_i q_i$ as an open arm. It is noted that at this point, the label (i.e., left arm or right arm) of the detected arm remains undefined since it is not obvious which arm the segment $p_i q_i$ corresponds to. In one embodiment, the process of detecting 462 an open arm is similar to the process of detecting 406 limbs through skeleton analysis as described above with relate to FIG. 4A. In another embodiment, the pose estimation system 100 combines the two processes into a single process. FIG. 7C are depth image frames with corresponding distance transformed skeleton images showing open arms detected 462 using the mechanism described above.

Figure 7D:
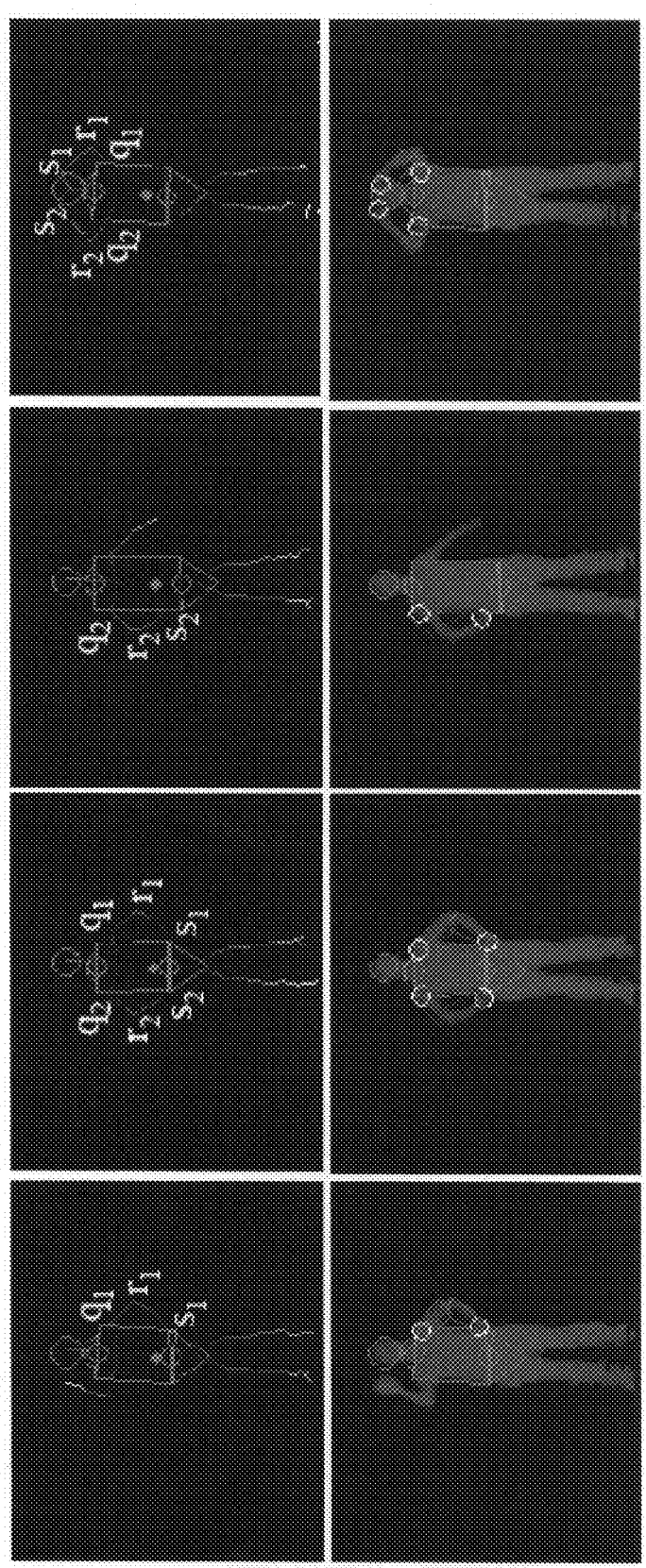

The pose estimation system 100 detects 464 loops by using the distance transformed skeleton image $I_D$ (or skeleton image $I_S$). A loop is detected when a local maximum non-terminal pixel is found in $I_D$. FIG. 7D are depth image frames with corresponding distance transformed skeleton images showing detected loops. As illustrated, $q_i$ represents the end point of the arc that is directly connected to the shoulder area of the trunk, while $s_i$ represents the other end point of the arc. The arc $q_i r_i s_i$ corresponds to an arm and that point $r_i$ closely approximates the elbow of the corresponding arm, where $r_i$ is the extreme point in the x axis. The label (i.e., left arm or right arm) of the arm forming the loop can be determined based on which side of the body the loop is located.

Figure 7E:
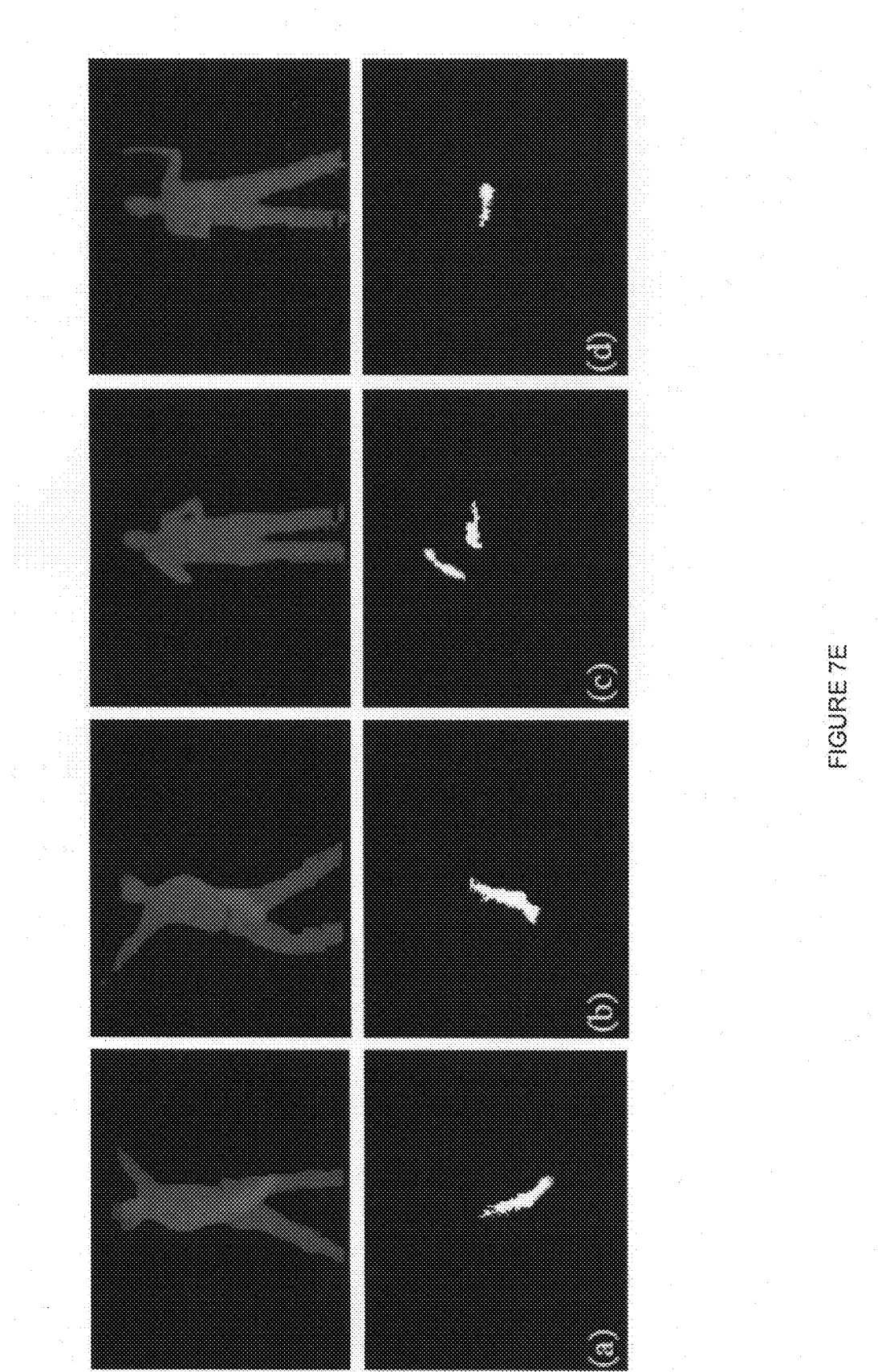

The pose estimation system 100 conducts 466 depth slicing analysis to detect 412 possible arm regions which occlude the torso. A slicing plane is moved along the depth axis from the camera toward the human subject. Connected components are extracted for regions whose depth values are closer to the camera than the slicing plane. The slicing continues until connected blobs become too large to be an arm (or leg, for the lower body limb analysis). FIG. 7E are depth image frames and corresponding arm regions detected 466 using the mechanism described above. In one embodiment, the pose estimation system 100 only conducts 466 depth slicing analysis if the number of image regions identified through detecting 462 open arms and detecting 464 loops is less than two.

The possible arm regions identified through steps 462, 464, and 466 are collectively represented by $I_{Arms}$.

Limb Label Assignment and Occlusion State Determination

After detecting 412, limb regions $I_{Arms}$ in occluded configurations, the pose estimation system 100 assigns 414 labels to the limb regions and determines 416 their occlusion states (or visible states). In one embodiment, the pose estimation system 100 uses a two-slice Bayesian network that integrates both temporal tracking and spatial context to assign 414 labels to the detected limbs and determine 416 their occlusion states. An example process to assign labels and determine occlusion states for upper body limbs (arms) are described first, followed by a brief description of a similar process to assign labels for lower body limbs (legs).

In the following description, notations LA and RA are used to label variables associated with the left arm and the right arm, respectively. Let $R_1$ and $R_2$ be two arm regions that are detected through open arm detection 462, $R_3$ and $R_4$ be arm regions detected through loop detection 464, and $R_5$ and $R_6$ be arm regions detected through depth slicing analysis 466. Because the pose estimation system 100 can at most detect 412 both arms, there can be at most two regions represented by $R_i$ (i=1, ..., 6). For an arm region detected through loop detection 464, the pose estimation system 100 can determine the associated label (i.e., left arm or right arm) of the arm region based on which side of the body the loop is located, and thereby assign correct labeling to depth pixels belonging to $R_3$ and $R_4$. The following description is directed to the labeling of the arm regions represented by $R_1$, $R_2$, $R_5$, and $R_6$, i.e., how the pose estimation system 100 assigns labels for $I_{Arms}$ defined as the intersection of these regions, $$I_{Arms} = \{I_x | x \in R_1 \cup R_2 \cup R_5 \cup R_6\}, \quad (11)$$

where $I_x$ is the depth value in the image at the location of pixel x. The goal for the pose estimation system 100 is to assign for each pixel x in $I_{Arms}$ a label $L_x$, where $L_x \in \{LA, RA\}$.

In the following description, each articulated limb is represented by a 2-dimensional (projected) model with parameters $\phi = \{(x_0, y_0), \alpha, \beta, l_1, l_2, w_1\}$, where $(x_0, y_0)$ is the shoulder location, $\alpha$ is the shoulder joint rotation angle, $\beta$ is the elbow joint rotation angle, $l_1$ is the upper arm length, $l_2$ is the lower arm length, and $w_1$ is the width of the limb. $X_{LA}$ and $X_{RA}$ represent the configuration representing the articulated left and right arm, respectively. Two auxiliary variables are used in the computation. The first one is occlusion state, $O_{LA}$ for the left arm and $O_{RA}$ for the right arm. The occlusion states are decided from the resulting labeling image $L_{Arms}$. Secondly, $H_{LA}$ and $H_{RA}$ are variables representing the histogram of depth values for pixels representing the left and right arms, respectively. The histogram is used to characterize the left and right arms during tracking.

Figure 6A:
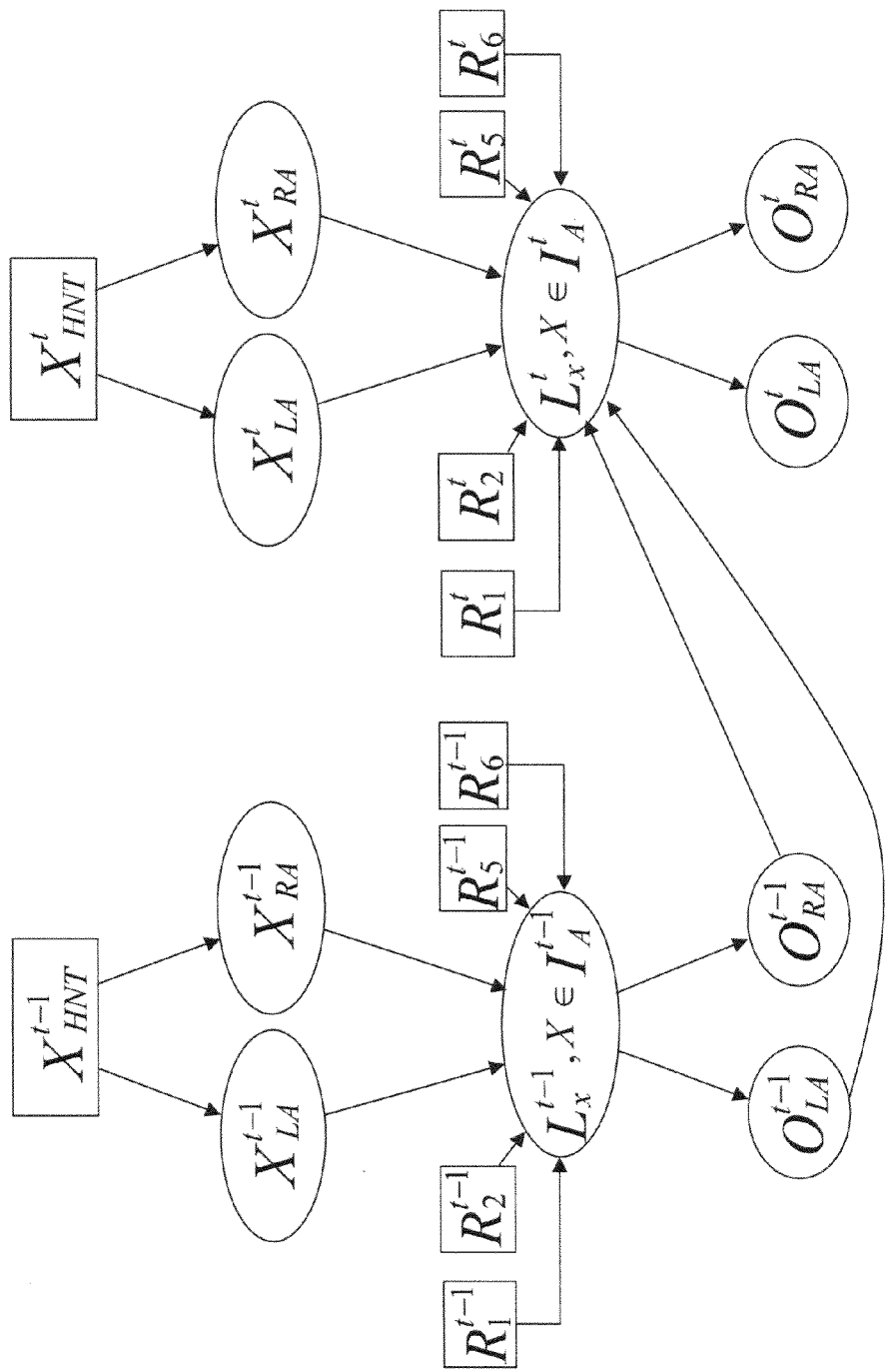
FIGS. 6A-B are diagrams illustrating Bayesian networks for limb labeling and occlusion inference in accordance with one embodiment of the invention.

FIG. 6A is a diagram illustrating an example Bayesian network for arm labeling and occlusion inference, according to one embodiment. As shown, using pose information from time slice t−1 denoted by $X_{LA}^{t-1}$ (or $X_{RA}^{t-1}$ for the right arm), the Bayesian network generates (i.e., by the pose reconstruction module 208) a prediction of pose for the left arm at time slice t, denoted as $\tilde{X}_{LA}^t$ (or $\tilde{X}_{RA}^t$ for the right arm). Based on the prediction $\tilde{X}_{LA}^t$ and the occlusion state $O_{LA}^{t-1}$, the Bayesian network calculates a probability $P(L_x)$ for each pixel x for how likely x belongs to the left arm at time t, given $I_{Arm}$ for time slice t. Similarly, the Bayesian network calculates a probability $P(R_x)$ for each pixel x for the likelihood of it belonging to the right arm at time t. The Bayesian network then assigns an appropriate label to pixel x using $P(L_x)$, and optimally computes $X_{LA}^t$ by using the set of pixels labeled LA. Finally, the Bayesian network uses $P(L_x)$ to determine the occlusion state at time slice t ($O_{LA}^t$). This process is described in further detail below.

In the following description, $X_{HNT}$ represents the Head, Neck, Trunk configuration localized through process 430. The location of the torso in $X_{HNT}$ determines the shoulder locations with Gaussian noise. As shown in the following example equation, the conditional probability of label assignment is defined based on the occlusion states from the last frame ($O^{t-1}$), tracked arm locations ($X^t$), and detected arm locations ($R_i^t$):

$$P(L_x^t = LA \mid O_{LA}^{t-1}, O_{RA}^{t-1}, X_{LA}^t, H_{LA}^t, X_{RA}^t H_{RA}^t, R_1^t, R_2^t, R_5^t, R_6^t) = \quad (12)$$

$$\begin{cases} P_1(L_x^t = LA \mid X_{LA}^t, H_{LA}^t, X_{RA}^t, H_{RA}^t) & \text{if } O_{LA}^{t-1} = 0, O_{RA}^{t-1} = 0 \\ P_2(L_x^t = LA \mid R_1^t, R_2^t, R_5^t, R_6^t) & \text{if } O_{LA}^{t-1} = 1, O_{RA}^{t-1} = 1 \\ P_3(L_x^t = LA \mid X_{LA}^t, H_{LA}^t, R_1^t, R_2^t, R_5^t, R_6^t) & \text{if } O_{LA}^{t-1} = 0, O_{RA}^{t-1} = 1 \\ P_4(L_x^t = LA \mid X_{RA}^t, H_{RA}^t, R_1^t, R_2^t, R_5^t, R_6^t) & \text{if } O_{LA}^{t-1} = 1, O_{RA}^{t-1} = 0 \end{cases}$$

The function $P_1(L_x^t = LA \mid \cdot)$ is determined by temporal tracking information when both arms are not previously occluded ($O_{LA}^{t-1}=0$, $O_{RA}^{t-1}=0$). This case occurs when both arms are beside the torso (i.e., the open arm positions illustrated in FIG. 7B(a)). The function $P_1(L_x^t = LA \mid \cdot)$ can be defined based on geometric distance and depth histograms as:

$$P_1(L_x^t = LA \mid X_{LA}^t, H_{LA}^t, X_{RA}^t, H_{RA}^t) = \frac{e^{-\gamma d_{LA}(x)} H_{LA}(I_x)}{e^{-\gamma d_{LA}(x)} H_{LA}(I_x) + e^{-\gamma d_{RA}(x)} H_{RA}(I_x)}, \quad (13)$$

where $d_{LA}(x)$ is the distance from pixel x to the left arm as defined in the equation below:

$$d_{LA(x)} = \begin{cases} 0 & \text{if } x \text{ is inside left arm} \\ d(x, LA) & \text{otherwise,} \end{cases} \quad (14)$$

where d(x, LA) is the minimal distance from pixel x to edges of the left arm. $d_{RA}(x)$ is defined similarly. In short, a pixel x has a high probability of belonging to the left arm, if x is sufficiently close to where the left arm was in the previous time slice (or depth image frame). In case two arms overlap in the image, x has a high probability of belonging to LA if it has a depth value that is close to one of depth values represented by the left arm in the previous depth image frame.

The function $P_2(L_x^t = LA \mid \cdot)$ is determined by spatial context information when there is no temporal tracking information for both arms ($O_{LA}^{t-1}=1$, $O_{RA}^{t-1}=1$). This case occurs when both arms are behind the torso, or when they are close to the torso. Assuming $x \in R_i^t$, the following equation defines the fraction of number of nonzero pixels in the overlapping regions of the detected arm ($R_i^t$) and left half torso ($R_{X_{LHT}^t}$) with respect to the number of non-zero pixels in the overlapping regions of the detected arm and the torso ($R_{X_T^t}$)

$$f_{x,Left}^t = \frac{\#\{R_i^t \cap R_{X_{LHT}^t}\}}{\#\{R_i^t \cap R_{X_T^t}\}}, \quad (15)$$

where the notation #{.} represents the number of nonzero pixels in the region defined inside the parenthesis. A nonzero pixel is a foreground pixel which is obtained from the background segmentation by removing the floor as well as scene objects that is farther than a threshold distance (e.g., the depth working volume). The spatial distribution of the left arm and the right arm given the torso position is defined as:

$$P_2(L_x^t = LA|\cdot) = \frac{f_{x,Left}^t}{f_{x,Left}^t + f_{x,Right}^t}. \quad (16)$$

The functions $P_3(L_x^t=LA|\cdot)$ and $P_4(L_x^t=LA|\cdot)$ are determined by hybrid temporal and spatial information when there is temporal tracking information for only one arm. This case occurs, for example, when one arm is visible and the other arm is occluded. Assuming that a tracked arm's position does not change drastically between successive depth image frames, the conditional probability is defined based on the overlapping area between enlarged tracked arm and detected arms. The pose estimation system 100 can enlarge a tracked arm by increasing its width and/or height. Let $R_{X_{LA}^t}$ represents the enlarged left arm region. The conditional probability of labeling, when the right arm is occluded and the left arm is tracked in the last depth image frame ($O_{LA}^{t-1}=0$, $O_{RA}^{t-1}=1$), is given as:

$$P_3(L_x^t = LA|\cdot) = \frac{\#\{R_i^t \cap R_{X_{LA}^t}\}}{\#\{R_i^t\}}. \quad (17)$$

The function $P_4(L_x^t=LA|\cdot)$ is defined similarly.

The conditional probability for occlusion states of the arms is given as:

$$P(O_{LA}^t = 0 | L_x^t, x \in I_{Arms}^t) = \frac{\sum_x 1_{(L_x^t=LA)}}{A_{LA}}, \quad (18)$$

$$P(O_{RA}^t = 0 | L_x^t, x \in I_{Arms}^t) = \frac{\sum_x 1_{(L_x^t=RA)}}{A_{RA}}, \quad (19)$$

where $1_{(condition)}$ is the indicator function with $1_{(condition)}=1$ if condition is true and $1_{(condition)}=0$ if condition is false. The parameters $A_{LA}$ and $A_{RA}$ are the projection of predicted left arm and right arm areas, respectively. Finally, based on labeling and occlusion states of upper-body limbs, a local optimization is performed for each visible arm in order to report the optimal estimation of the arm pose.

$$\hat{X}_{LA}^t = \arg\min_{\alpha,\beta,l_1,l_2}\{E_{LA(\alpha,\beta,l_1,l_2)}\}. \quad (20)$$

and $$E_{LA}(\alpha, \beta, l_1, l_2) = N_{O1A} + N_{10A} + w*|l_1 - l_2|, \quad (21)$$

where $\hat{X}_{LA}^t$ stands for the optimal limb pose parameters $\{\alpha,\beta, l_1,l_2\}$ at timestamp t that minimizes the error function $E_{LA}(\alpha, \beta,l_1,l_2)$, $N_{O1A}$ is the number of pixels located inside the left arm template $X_{LA}$ whose labels are not LA, $N_{10A}$ is the number of pixels located outside the left arm template $X_{LA}$ whose labels are LA, and w is a weight that is selected based on experiments.

Figure 6B:
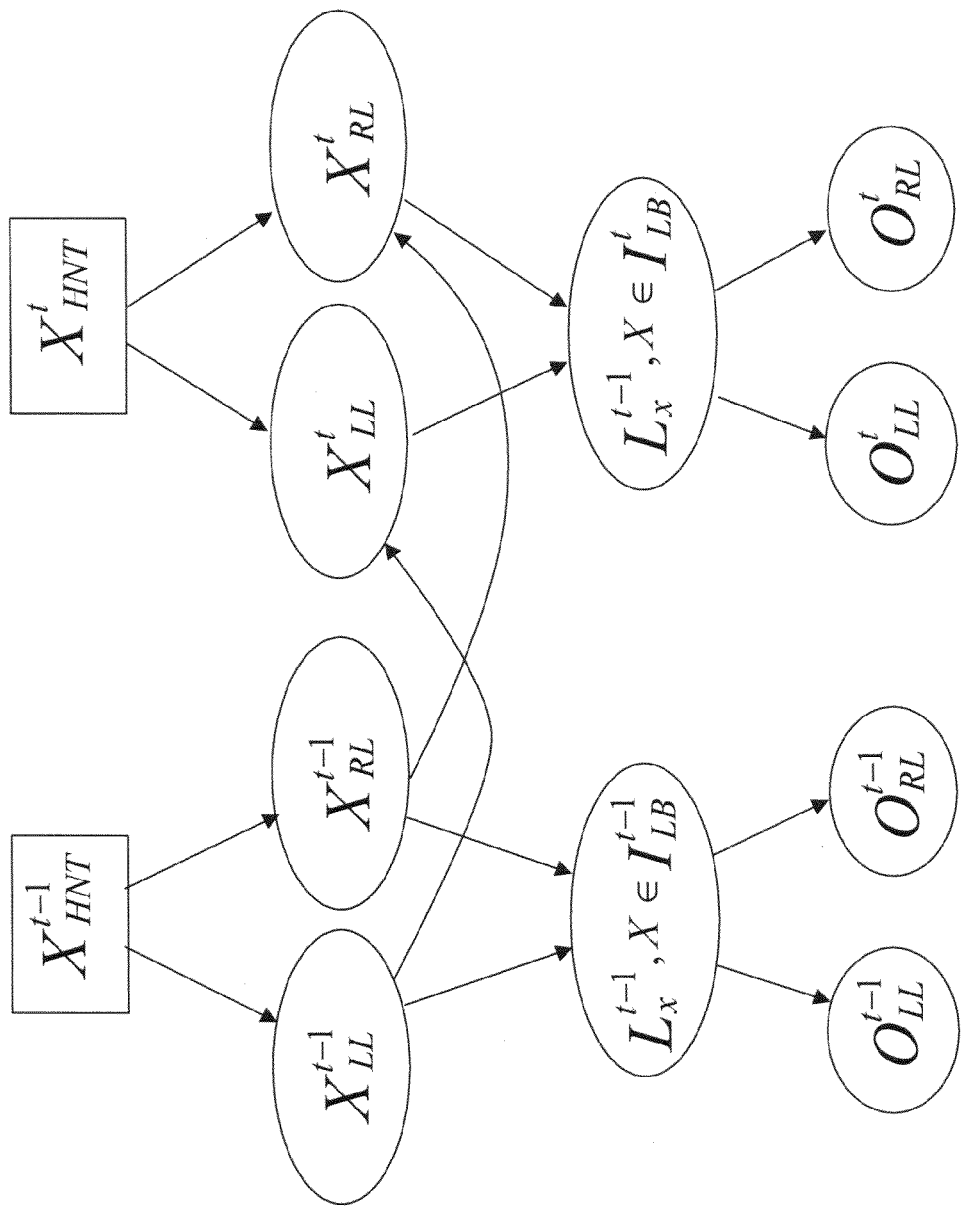

Labeling for the lower body limbs is done in a manner similar to the one for the upper body limbs as described above. In the following description, notations LL and RL are used to label variables associated with the left leg and the right leg, respectively. An example two-slice Bayesian network used to label legs are illustrated in FIG. 6B. The location of the waist from the observed $X_{HNT}$ determines the location of left and right pelvis with Gaussian noise. The conditional probability of label assignment is defined as:

$$P(L_x^t = LL | X_{LL}^t, H_{LL}^t, X_{RL}^t, H_{RL}^t) = \quad (22)$$
$$\frac{e^{-\gamma d_{LL}(x)}H_{LL}(I_x)}{e^{-\gamma d_{LL}(x)}H_{LL}(I_x) + e^{-\gamma d_{RL}(x)}H_{RL}(I_x)}$$

where $d_{LL}(x)$ is the distance from x to the left leg:

$$d_{LL}(x) = \begin{cases} 0 & \text{if } x \text{ is inside left leg} \\ d(x, LL) & \text{otherwise,} \end{cases} \quad (23)$$

where d(x, LL) is the minimal distance from x to edges of the left leg. $d_{RL}(x)$ is defined similarly. The rest of the process is the same as that for the upper-body limbs. In case of the lower-body labeling, the formulation is simpler than that of the upper-body due to the fact that legs do not occlude the trunk.

Once the limbs are detected 412, labeled 414, and their occlusion states determined 416, the pose estimation system 100 localizes 418 the fourteen 3D features shown in FIG. 5A using the mechanism described above.

Pose Estimation and Feature Prediction

The pose estimation system 100 (or the pose reconstruction module 208) reconstructs 340 the observed body pose q of the human actor and predicts subsequent features positions p. In one embodiment, the pose estimation system 100 reconstructs 340 q by prioritizing features according to their importance (or confidence) and tracking the observed poses (Cartesian tracking control). In addition, the pose estimation system 100 predicts subsequent feature positions by enforcing kinematic constraints of the human model, such as joint limitations and self penetration avoidance, which may be categorized as joint limit avoidance (for joint body segments) and self penetration avoidance (for unconnected body segments). These operations are described in detail below.

Cartesian Tracking Control

In one embodiment, the pose estimation system 100 applies a control policy (called Cartesian tracking control) that produces the joint variables (q) such that the Cartesian error between the estimated features and the desired (from observations) features are minimized. The tracking performance is subject to the human model kinematic constraints as well as the execution of multiple and often conflicting feature tracking requirements. In one embodiment, the pose estimation system 100 employs a tracking control approach based on a Cartesian space kinematic control method known as closed loop inverse kinematics (CLIK). The basis for the solution of the CLIK algorithm is the inversion of the differential kinematics relating Cartesian variables and joint variables as described by Equation 1. For simplicity, the superscript i with reference to the $i_{th}$ feature is temporarily omitted in the present section.

Let the desired variables be denoted by a subscript d. The joint velocities may be computed by inverting Equation 1 and adding a feedback error term to correct for numerical drift.

$$\dot{q} = J^*(\dot{p}_d + K e), \quad (24)$$

where $J^*$ denotes the regularized right pseudo-inverse of J weighted by the positive definite matrix $W_1$, $$J^* = W_1^{-1} J^T (J W_1^{-1} J^T + \lambda^2 I)^{-1}. \quad (25)$$

The parameter $\lambda > 0$ is a damping term, and I is an identity matrix. The vector $\dot{p}_d$ corresponds to the desired feature velocity. The matrix K is a diagonal 3×3 positive definite gain matrix, and e is a vector that expresses the position error between the observed and computed features. The position error is simply defined as $e = p_d - p$, where $p_d$ and p correspond to the observed and computed feature positions, respectively.

Managing Multiple Features

In one embodiment, the pose estimation system 100 (or the pose reconstruction module 208) prioritizes features according to their importance or the level of confidence in the observations. For example, since elbow positions are difficult to detect, they may be designated as secondary features while others are designated as primary features.

The formulation above considers estimation of human pose from a single feature. Multiple features can be handled in two ways, namely by augmentation or prioritization. These methods are described in detail in robot motion control literature. See B. Siciliano and J. Slotine, "A general framework for managing multiple tasks in highly redundant robotic systems", *International Conference on Advanced Robotics*, volume 2, pages 1211-1216, Pisa, Italy (1991), the content of which is incorporated by reference herein in its entirety. In one embodiment, the pose estimation system 100 utilizes feature augmentation which refers to the concatenation of the individual spatial velocities and the associated Jacobian matrix and feedback gain matrix.

Let i (i=1 . . . k) be the index of the $i_{th}$ feature $\dot{p}_i$ and the associated Jacobian $J_i$. The pose estimation system 100 forms a 3k×1 augmented spatial velocity vector $\dot{p}$ and a 3k×n augmented Jacobian matrix J as follows, $$\dot{p} = [\dot{p}_1^T \ldots \dot{p}_i^T \ldots \dot{p}_k^T]^T, \quad (26)$$

$$J = [J_1^T \ldots J_i^T \ldots J_k^T]^T. \quad (27)$$

Likewise, $\dot{p}_d$ in the augmented space is the concatenation of the individual feature velocity vectors. The solution of tracking control algorithm in the augmented system follows the same way as that previously described by Equation 24. The tracking error rate for each element of a feature can be controlled by the augmented feedback gain matrix K, which represents a 3k×3k diagonal matrix in the augmented space. The trajectory tracking error convergence rate depends on the eigenvalues of the feedback gain matrix in Equation 24: the larger the eigenvalues, the faster the convergence. In one embodiment, the function is implemented as discrete time approximation of the continuous time system. Therefore, it is reasonable to predict that an upper bound exists on the eigenvalues, depending on the sampling time. A particular feature or its individual components can be more tightly tracked by increasing the eigenvalue of K associated with that direction. By modulating the elements of K, the pose estimation system 100 can effectively encode the relative level of confidence observed. Measurements with higher confidence will be assigned higher feedback gain values.

Constrained Closed Loop Inverse Kinematics

The pose estimation system 100 takes into account human model kinematic constraints in tracking the detected human poses in the human model. Example kinematic constraints include joint limits and self penetration constraints. A constrained closed loop inverse kinematics algorithm (CCLIK) that integrates such kinematic constraints into the CLIK formulation is described in detail in the following sections.

Joint Limit Avoidance Constraints

In one embodiment, joint limit avoidance is achieved in the pose estimation system 100 by the proper selection of the weighting matrix $W_l$ in Equation 25. One example weighting matrix is defined by the Weighted Least-Norm (WLN) solution. The WLN solution was originally proposed by T. F. Chan and R. V. Dubey, "A weighted least-norm solution based scheme for avoiding joint limits for redundant joint manipulators", IEEE Transactions on Robotics and Automation, 11 (2), (1995), the content of which is incorporated by reference herein in its entirety. A WLN solution is formulated in the context of Damped Least Squares Jacobian inverse. The WLN solution is utilized to generate an appropriate weighting matrix based on the gradient of a joint limit function to dampen joints nearing their limits. This solution is described below.

A candidate joint limit function that has higher values when the joints near their limits and tends to infinity at the joint limits is denoted by H(q). One such candidate function proposed by Zghal et al. is given by $$H(q) = \frac{1}{4} \sum_{i=1}^{n} \frac{(q_{i,max} - q_{i,min})^2}{(q_{i,max} - q_i)(q_i - q_{i,min})}, \quad (28)$$

where $q_i$ represents the generalized coordinates of the $i_{th}$ degree of freedom, and $q_{i,min}$ and $q_{i,max}$ are the lower and upper joint limits, respectively. See H. Zghal and R. V. Dubey, "Efficient gradient projection optimization for manipulators with multiple degrees of redundancy", *Int. Conf Robotics and Automation*, volume 2, pages 1006-1011 (1990), the content of which is incorporated by reference herein in its entirety. The upper and lower joint limits represent the more conservative limits between the physical joint limits and the virtual joint limits used for collision avoidance. Note that H(q) is normalized to account for the variations in the range of motion. The gradient of H, denoted as ∇H, represents the joint limit gradient function, an n×1 vector whose entries point in the direction of the fastest rate of increase of H.

$$\nabla H = \frac{\partial H}{\partial q} = \left[ \frac{\partial H}{\partial q_1}, \ldots, \frac{\partial H}{\partial q_n} \right]. \quad (29)$$

The element associated with joint i is given by, $$\frac{\partial H(q)}{\partial q_i} = \frac{(q_{i,max} - q_{i,min})^2(2q_i - q_{i,max} - q_{i,min})}{4(q_{i,max} - q_i)^2(q_i + q_{i,min})^2}. \quad (30)$$

The gradient $$\frac{\partial H(q)}{\partial q_i}$$

is equal to zero if the joint is at the middle of its range and goes to infinity at either limit. The joint limit gradient weighting matrix, denoted by $W_{JL}$, is defined by the following n×n diagonal matrix with diagonal elements $w_{JLi}$ (i=1 ... n):

$$W_{JL} = \begin{bmatrix} w_{JL1} & 0 & 0 & 0 \\ 0 & w_{JL2} & 0 & 0 \\ 0 & 0 & \ddots & 0 \\ 0 & 0 & 0 & w_{JLn} \end{bmatrix}. \quad (31)$$

The weighting matrix $W_1$ in Equation 25 is constructed by $W_{JL}$ (e.g., $W_1 = W_{JL}$). The diagonal elements $W_{JLi}$ are defined by:

$$w_{JLi} = \begin{cases} 1 + \left|\frac{\partial H}{\partial q_i}\right| & \text{if } \Delta|\partial H/\partial q_i| \geq 0 \\ 1 & \text{if } \Delta|\partial H/\partial q_i| < 0. \end{cases} \quad (32)$$

The term $\Delta|\partial H/\partial q_i|$ represents the change in the magnitude of the joint limit gradient function. A positive value indicates the joint is moving toward its limit while a negative value indicates the joint is moving away from its limit. When a joint moves toward its limit, the associated weighting factor described by the first condition in Equation 32, becomes very large causing the motion to slow down. When the joint nearly reaches its limit, the weighting factor is near infinity and the corresponding joint virtually stops. If the joint is moving away from the limit, there is no need to restrict or penalize the motions. In this scenario, the second condition in Equation 32 allows the joint to move freely. Therefore, $W_{JL}$ can be used for joint limit avoidance.

Self Penetration Avoidance

Self penetration avoidance may be categorized as one of two types: 1) penetration between two connected segments, and 2) penetration between two unconnected segment pairs. By connected segment pairs, it is implied that the two segments are connected at a common joint and assumed that the joint is rotational.

If two segments are connected at a common rotational joint, i.e. connected segments, self collision may be handled by limiting the joint range as described in detail above with relate to joint limit avoidance constraints. Joint limits for self penetration avoidance need not correspond to the anatomical joint limits. Rather, they may be more conservative virtual joint limits whose values are obtained by manually verifying the bounds at which collision does not occur. Therefore, for two segments connected by a rotational joint, joint limit avoidance and self penetration avoidance may be performed by using the same techniques presented above.

Figure 8:
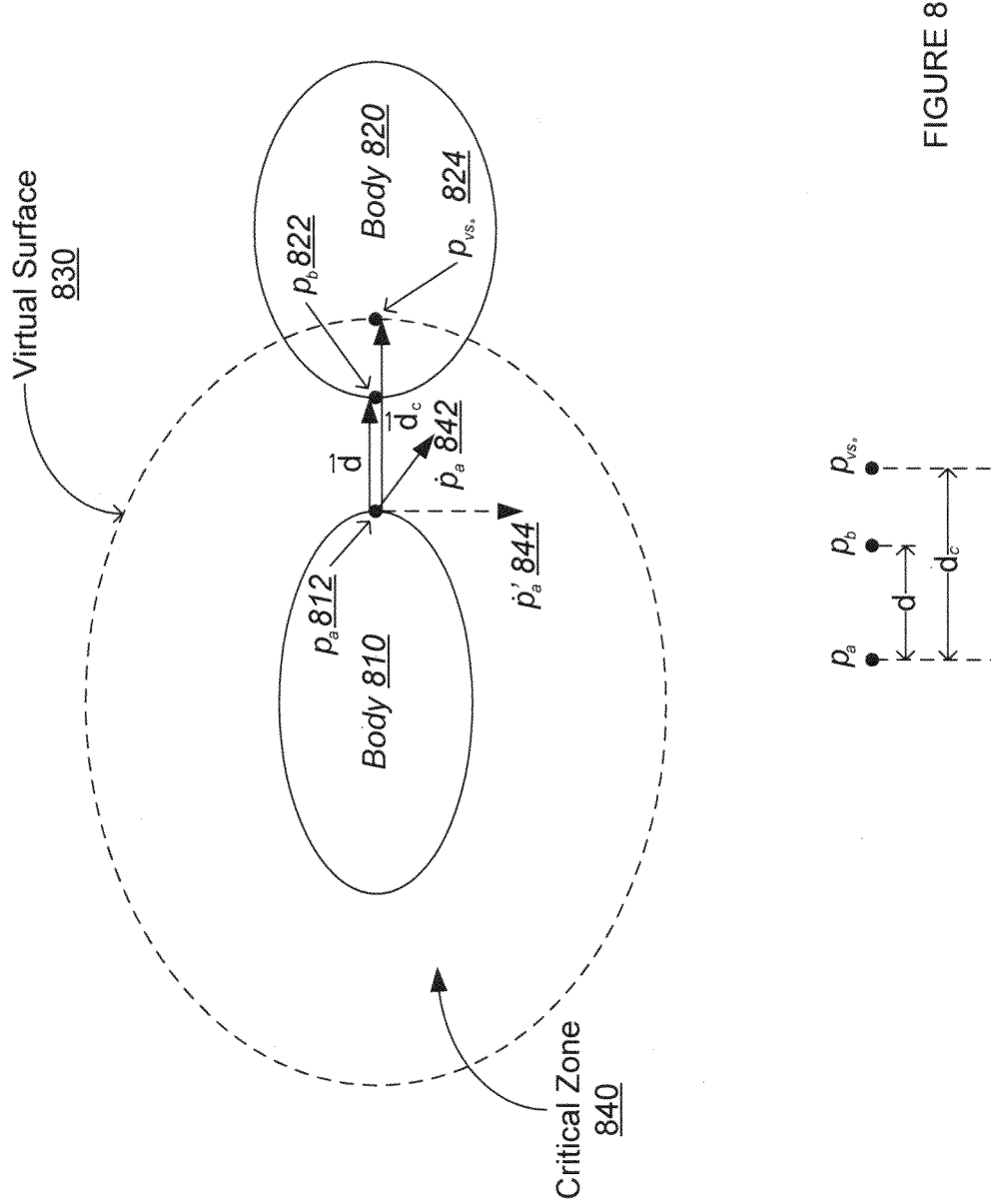
FIG. 8 is a diagram illustrating two unconnected rigid bodies redirected to avoid colliding into each other in accordance with one embodiment of the invention.

Considering the case of self penetration between two unconnected bodies, i.e. bodies which do not share a joint. FIG. 8 is a diagram illustrating two unconnected rigid bodies 810, 820 (i.e., bodies which do not share a joint) redirected to avoid colliding into each other according to one embodiment. In general, body 810 (also referred to as body A) and body 820 (also referred to as body B) may both be in motion. However, for simplicity and without losing generality, suppose body A is moving toward a stationary body B, as indicated by linear velocity $\dot{p}_a$ 842. The coordinates of the shortest distance d (d≥0) between the two bodies are denoted by $p_a$ 812 and $p_b$ 822, referring to the base frame of the joint space. The two points, $p_a$ and $p_b$, are also referred to as collision points.

The unit normal vector between the collision points is denoted by $$\hat{n}_a = \frac{p_b - p_a}{|p_b - p_a|},$$

and the vector pointing from $p_a$ to $p_b$ is denoted by $\vec{d} = d\,\hat{n}_a$. A 3-dimensional virtual surface 830 is constructed to surround body A, shown by a dashed line in FIG. 8. For every point on body A, its associated virtual surface point is located by a vector $\vec{d}_c = d_c \hat{n}$, where $d_c$ is a critical distance, and $\hat{n}$ is the unit normal vector at the surface point. The coordinates of the point on the virtual surface corresponding to $p_a$, denoted by $p_{vs_a}$ 824, is defined by $$p_{vs_a} = p_a + d_c \hat{n}_a. \quad (33)$$

The region between the actual surface of body A and its virtual surface 830 is referred to as the critical zone 840. If body B is stationary, the motion at $p_a$ can be redirected to prevent penetration in the critical zone 840. This redirection is invoked when $d < d_c$.

According to one embodiment, the pose estimation system 100 controls (or redirects) the motion of $p_a$ by modifying the trajectory of the desired task feature $p_d$. A redirected motion of $p_a$ is denoted by $p'_a$ and its associated velocity by $\dot{p}'_a$ 844.

The collision point can be redirected to prevent the two bodies from penetrating deeper into the critical zone 840 using different magnitude and direction of $\dot{p}'_a$ 844. In one embodiment, the collision point $p_a$ is redirected in a direction opposite to the unit normal vector $\hat{n}_a$. In another embodiment, the collision point $p_a$ is redirected so that it slides along a direction which is tangent to the surface of body A at the collision point $p_a$, as shown in FIG. 8.

$$\dot{p}'_a = \dot{p}_a - \langle \dot{p}_a, \hat{n}_a \rangle \hat{n}_a. \quad (34)$$

Utilizing the above redirection vector, the collision point motion of $p_a$ is guided along the virtual surface boundary, producing a more natural motion toward its target.

To find the mapping between $\dot{p}'_a$ and $\dot{p}_d$, consider first the equivalent redirected joint velocity vector $\dot{q}'$, given by $$\dot{q}' = J^*_a \dot{p}'_a + SJ^*_a (\dot{p}_d + Ke), \quad (35)$$

where $J_a = \partial p_a/\partial q$ is the Jacobian at the collision point $p_a$ and $J^*_a$ is its weighted Damped Least Squares inverse. The matrix $S = \text{diag}(s_1, \ldots s_n)$ is a diagonal selection matrix where $s_i = 1$ when the $i_{th}$ column of $J_a$ has all zero entries and $s_i = 0$ elsewhere. The term $J^*_a(\dot{p}_d + Ke)$ is the joint velocity solution obtained from Equation 24.

The physical interpretation of Equation 35 is as follows. The first term determines the joint velocities needed to redirect the collision point velocities along $\dot{p}'_a$. Any zero column of $J_a$ (all zero entries) implies that the associated degree of freedom does not contribute to the motion of the collision point $p_a$. The second term in Equation 35 is the orthogonal complement of the first term which computes the entries for those joint velocities which do not affect the motion of the collision point $p_a$.

Based on the collision free joint velocity commands computed from Equation 35, a redesigned position task descriptor trajectory may be computed as follows $$\dot{p}'_d = J\dot{q}. \quad (36)$$

The closed loop inverse kinematics equation with the modified parameters is given by $$\dot{q} = J^*(\dot{p}'_d + K'e'), \quad (37)$$

where $e' = p'_d - p'$ and $K'$ is an adaptively changing diagonal feedback gain matrix whose values decrease as the distance d decreases. Note that $p'_d$ at the current time t may be computed by a first order numerical integration, $$p'_d(t) = p'_d(t-dt) + \dot{p}'_d(t-dt)dt. \quad (38)$$

The instantaneous redirection $\dot{p}_a \rightarrow \dot{p}'_a$, as described above, produces a discontinuous first derivative of $p_a$ at the boundary $d = d_c$. The discontinuity at $\dot{p}_a$ results in a discontinuity in $\ddot{p}_d$, as given by the solution in Equation 36. To preserve first order continuity, the solutions of $\dot{p}'_d$ may be blended before and after redirection occurs. A blended solution to Equation 36 is given by $$\dot{p}'_d = (1-b)\dot{p}_d + bJ_p\dot{q}', \quad (39)$$

where b is a suitable blending function such as the following Sigmoidal function $$b(d) = \frac{e^{-\alpha(d/d_c - \delta)}}{1 + e^{-\alpha(d/d_c - \delta)}}, \quad (40)$$

where $\alpha$ and $\delta$ are scalar parameters used to modulate the blending rate and shift of the blending function, respectively. Further information of the blending function is found in U.S. application Ser. No. 12/257,664, filed Oct. 24, 2008, titled "Real-Time Self Collision And Obstacle Avoidance", the content of which is incorporated by reference herein in its entirety.

The case where body A is stationary and body B is in motion is the dual of the problem considered above. When both body A and body B are in motion, the redirection vectors can be specified at the critical points $p_a$ and $p_b$ and the task augmentation can be utilized to control both critical points. The augmented velocity vector and Jacobian at the critical points are described by, $$\dot{p}_{ab} = [\dot{p}'_a \dot{p}'_b]^T, \quad (41)$$

$$J_{ab} = [J_a J_b]^T. \quad (42)$$

The redirected joint velocities can be solved following the same procedure as in Equation 35, $$\dot{q}' = J^*_{ab}\dot{p}'_{ab} + SJ^*_{ab}(\dot{p}_d + Ke). \quad (43)$$

The redirected task descriptors and the inverse kinematics solution follows the same procedure as previously described when only the motion of body A is considered. Further information of a process for preventing collisions between unconnected bodies utilizing the above algorithm is found in U.S. application Ser. No. 12/257,664, filed Oct. 24, 2008, titled "Real-Time Self Collision And Obstacle Avoidance", the content of which is incorporated by reference herein in its entirety.

EXAMPLES

One embodiment of the disclosed human pose estimation system is tested using a single TOF camera. The human performer was instructed to face the camera and perform various complex actions involving body twists up to 40 degree rotation on either side of a front facing posture. To initialize the tracking, the performer assumes a configuration which does not result in self occlusions (for example, a T-pose) for about 1-2 seconds.

The described system can also be used to detect and track only the upper-body poses, as needed by online interactive performance for certain applications, such as human to humanoid robot motion retargeting. For additional information about the upper-body human pose tracking, see B. Dariush, M. Gienger, A. Arumbakkam, C. Goerick, Y. Zhu, and K. Fujimura; "Online and markerless motion retargeting with kinematic constraints", *Int. Conf. Intelligent Robots and Systems (IROS)*, pages 191-198, Nice, France (2008), the content of which is incorporated by reference herein in its entirety.

FIGS. 9A-F illustrate snapshots of limb detection and pose reconstruction results for an upper-body sequence corresponding to motions of violin playing, orchestra conductor, cello playing, swimming, Frisbee throwing, and Taiji dance, respectively. Whole-body tracking and reconstruction results are shown in FIGS. 9G-I. Rows 1 and 3 in each Figure illustrate the limb detection and tracking results superimposed onto the depth image. The reconstructed human model pose is shown in rows 2 and 4.

The limb detection templates are color coded to indicate limb labels (right and left), type of analysis (self-occluded or non-occluded), and whether there is sufficient confidence in the detection results. In particular, the following color coding is used: green (left arm/leg detected from skeleton analysis), yellow (left arm/leg detected from depth slicing), blue (right arm/leg detected from skeleton analysis), and pink (right arm/leg detected from depth slicing).

Furthermore, when the system cannot reliably detect a limb templates or the H-N-T template, the associated templates are color coded with white. An arm/leg that is color coded with white is treated as an occluded limb. When the H-N-T template is not detected, the entire frame is skipped. When the H-N-T template is detected, the template is shown by a red color. Finally, a cyan color arm/leg template indicates the presence of severe self occlusions and the predicted arm position is used.

Figure 9A:
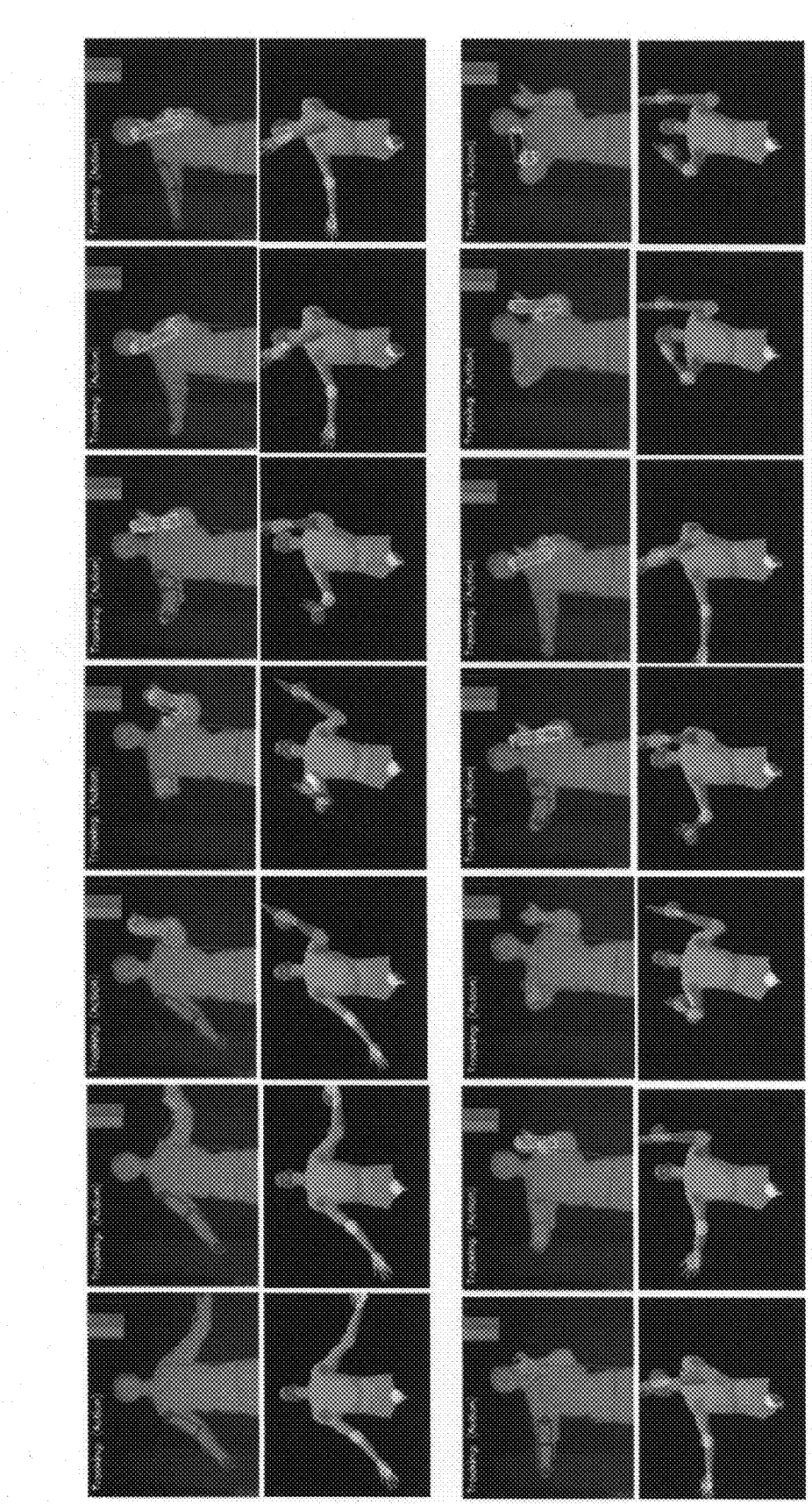
FIGS. 9A-I are diagrams showing results of human body pose estimation in accordance with one embodiment of the invention.
Figure 9B:
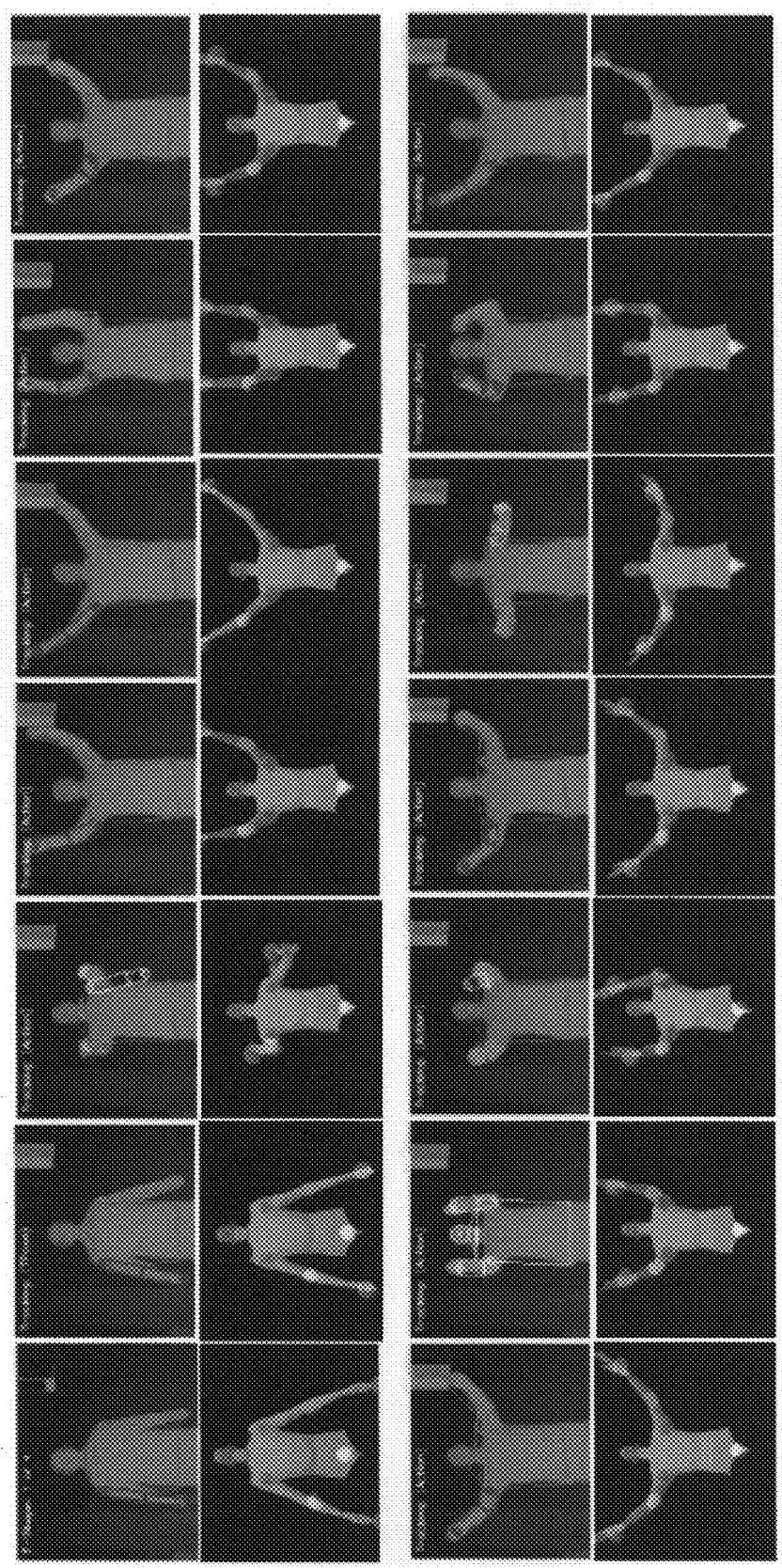
Figure 9C:
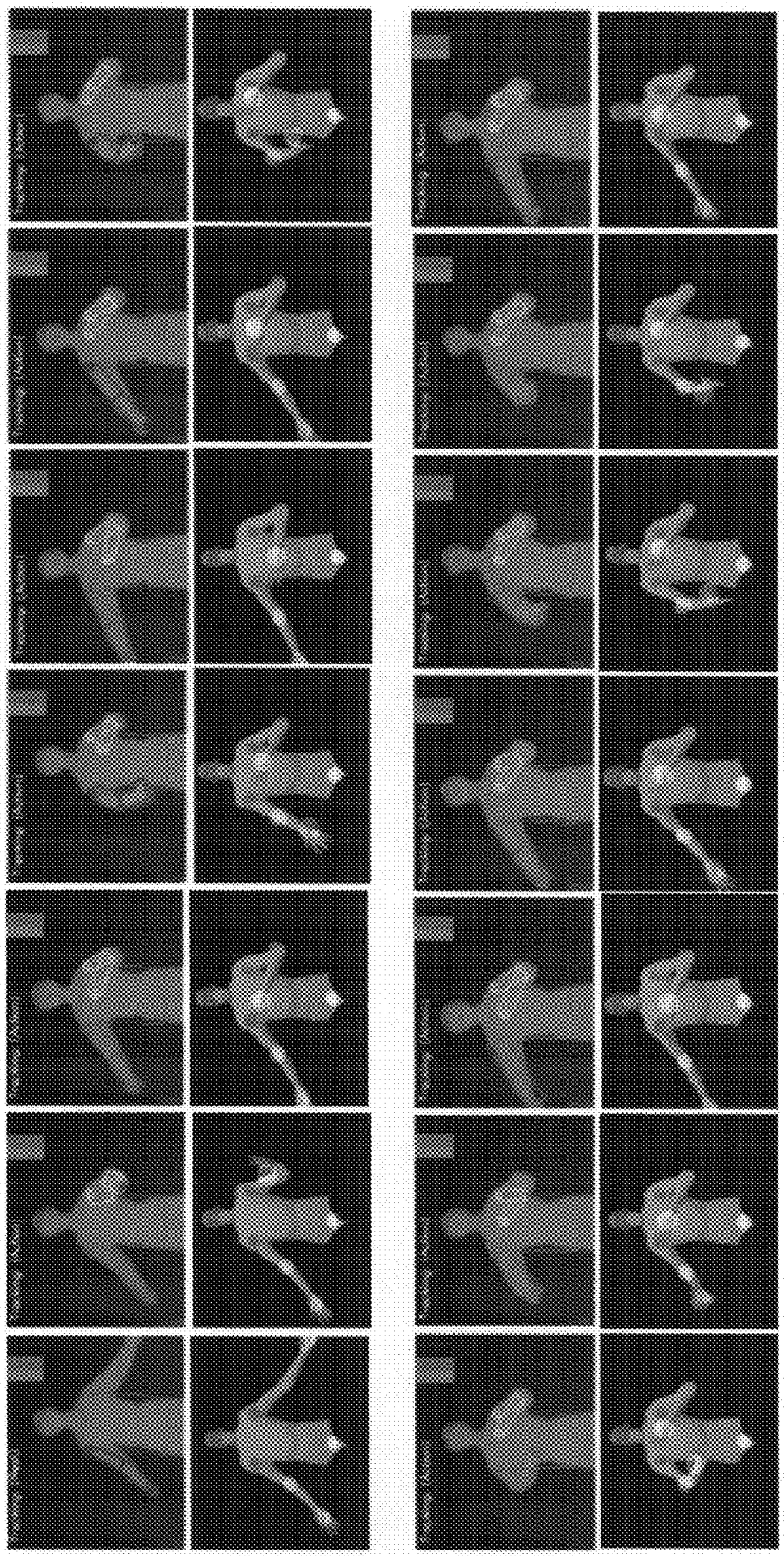
Figure 9D:
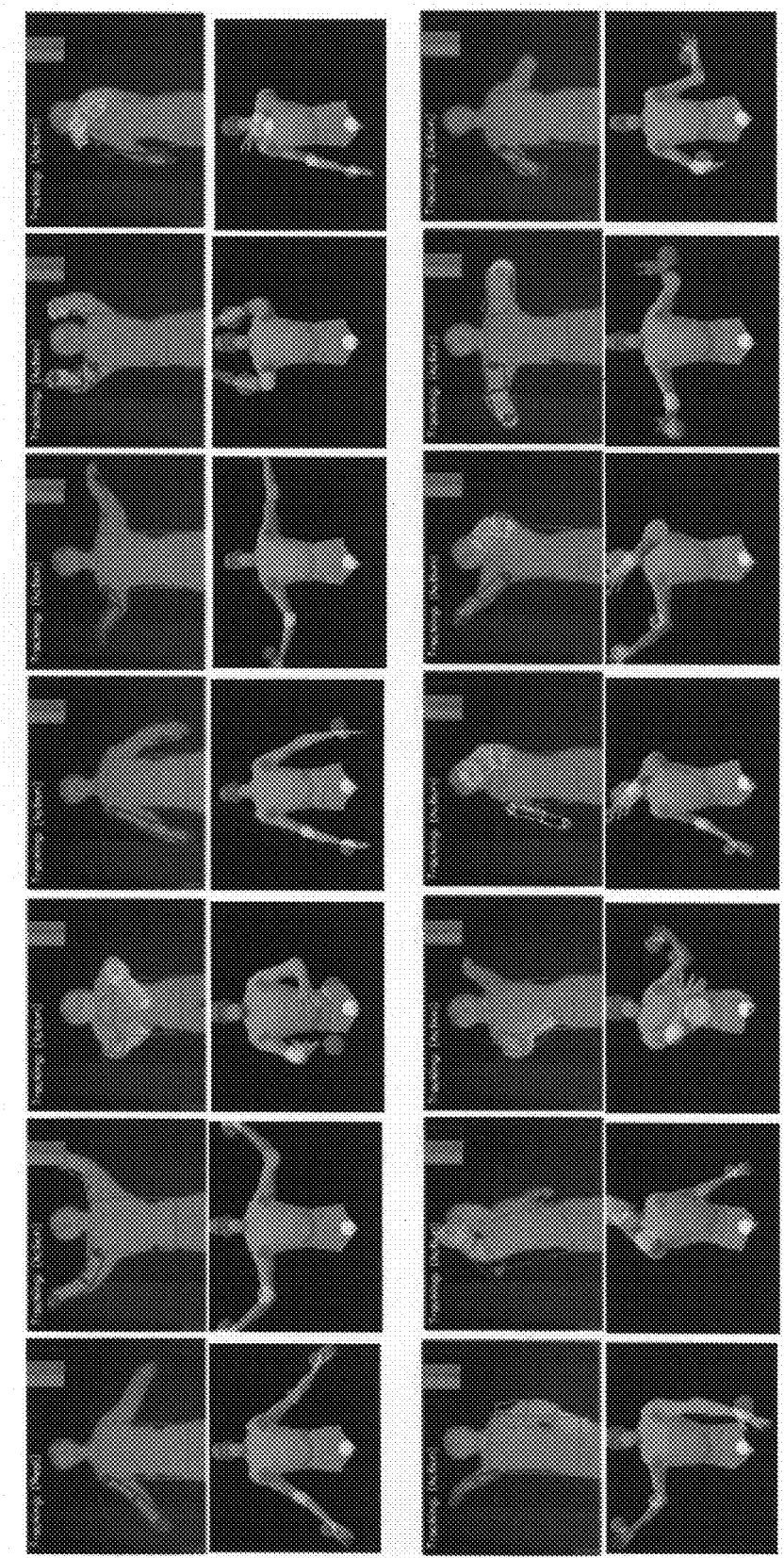
Figure 9E:
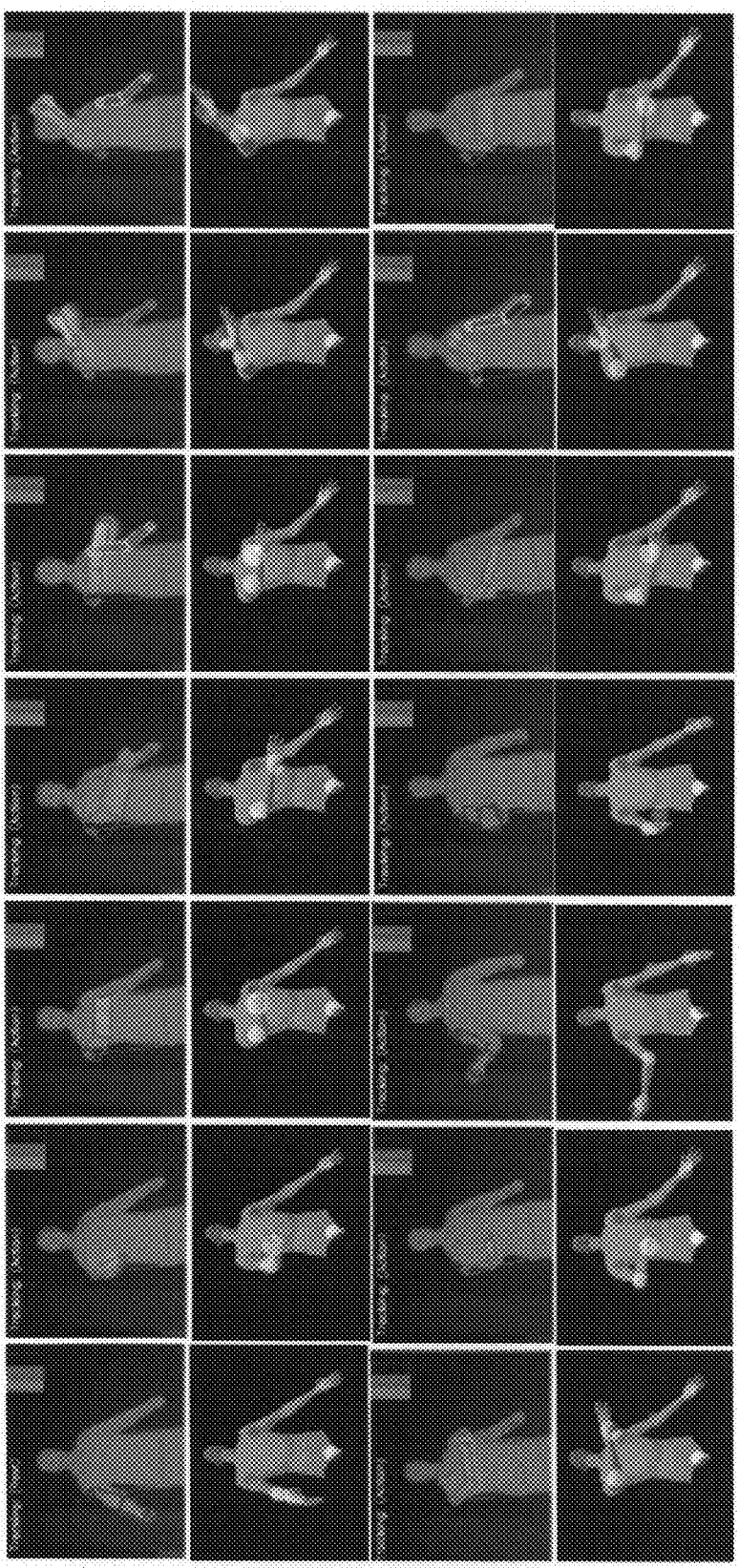
Figure 9F:
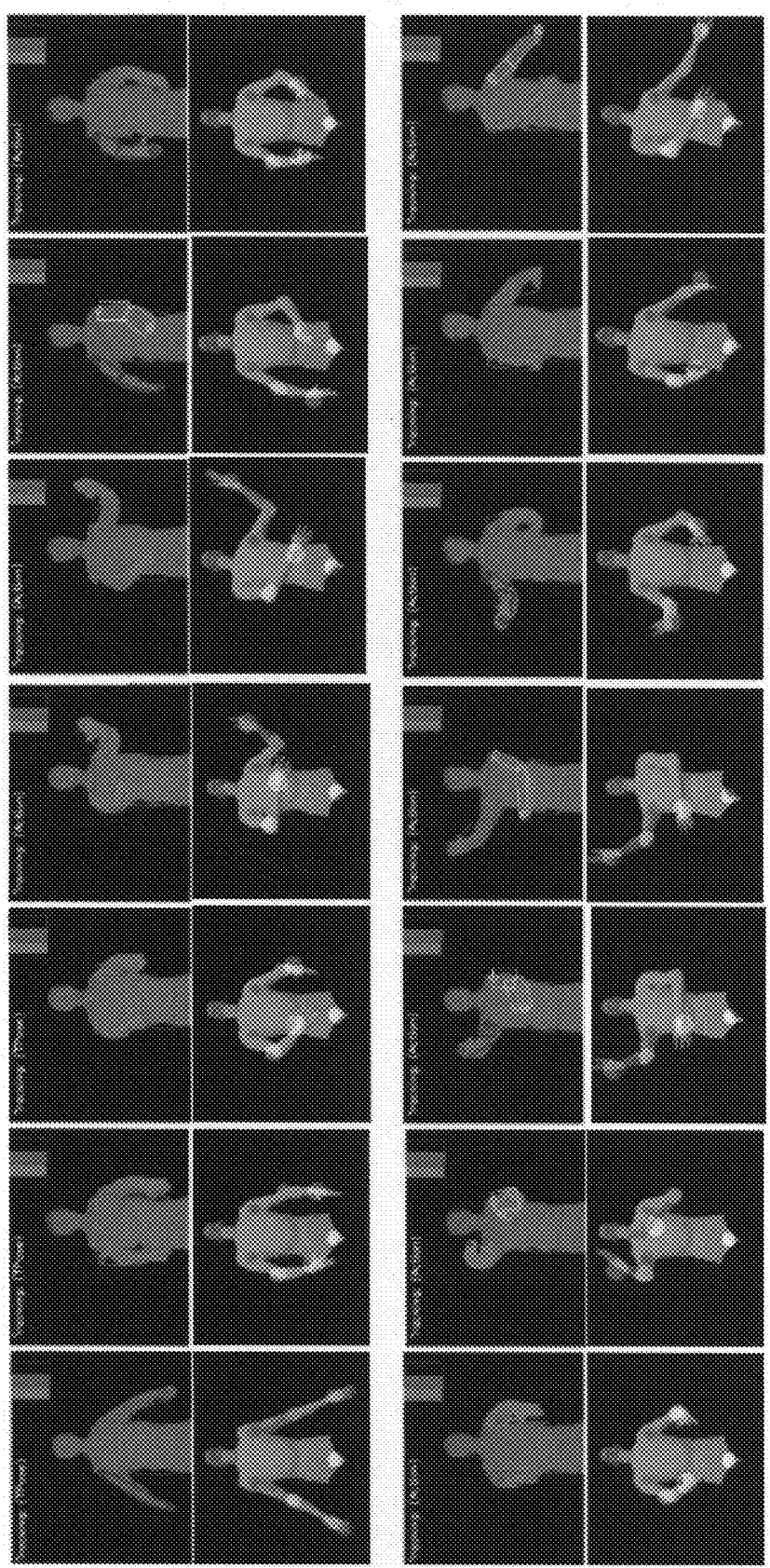

An example of low-confidence detection result (white color coding) is illustrated in the last frame (bottom right corner) of FIG. 9A. In this case, the algorithm relies on feedback from the predicted key-points which are shown on the reconstructed kinematic model. Yet another instance can be found in FIG. 9B (row 3, 2nd and 3rd frame from left). For the whole body sequence, FIG. 9H shows three frames where a leg is not reliably detected and shown in white.

Figure 9G:
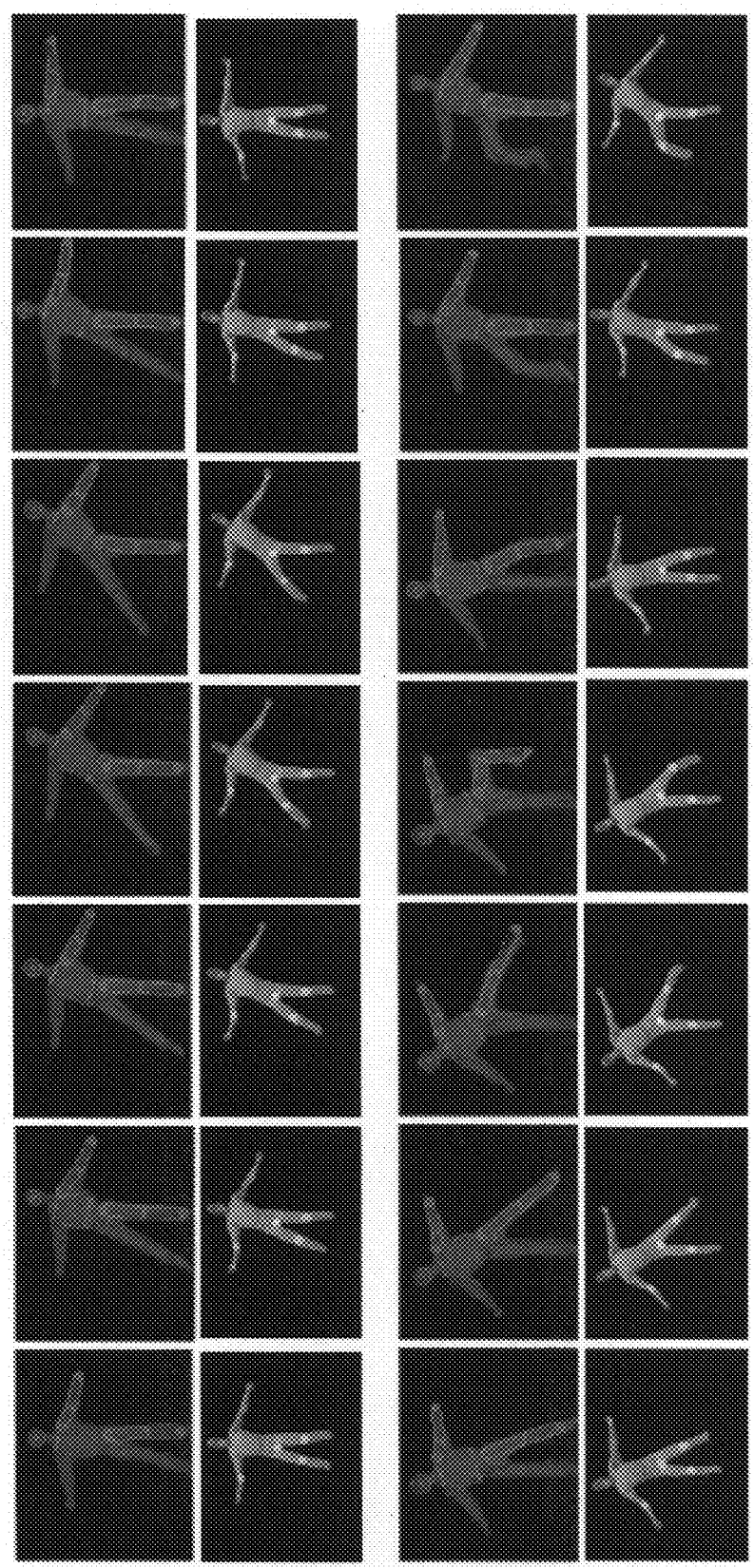
Figure 9H:
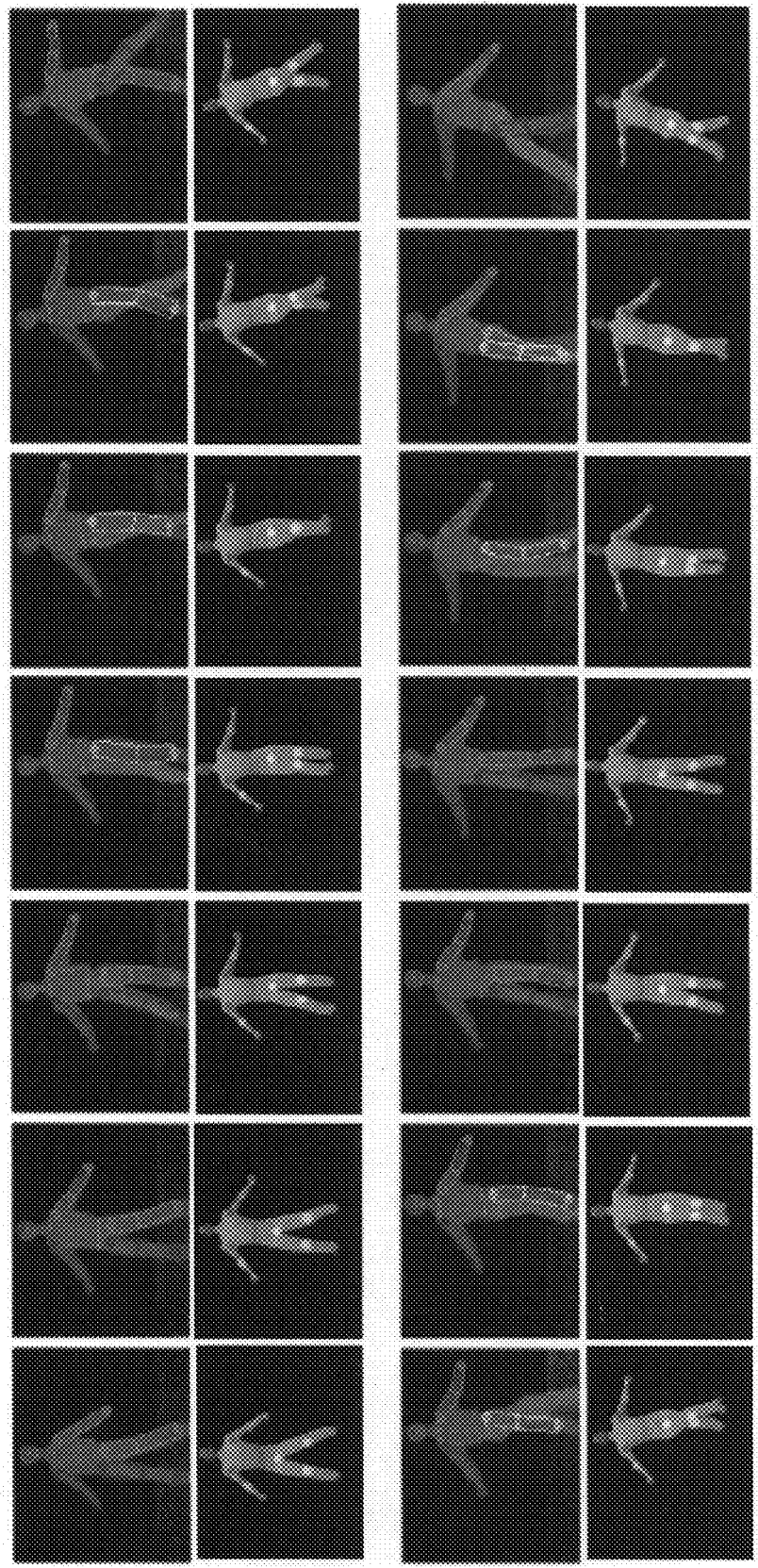
Figure 9I:
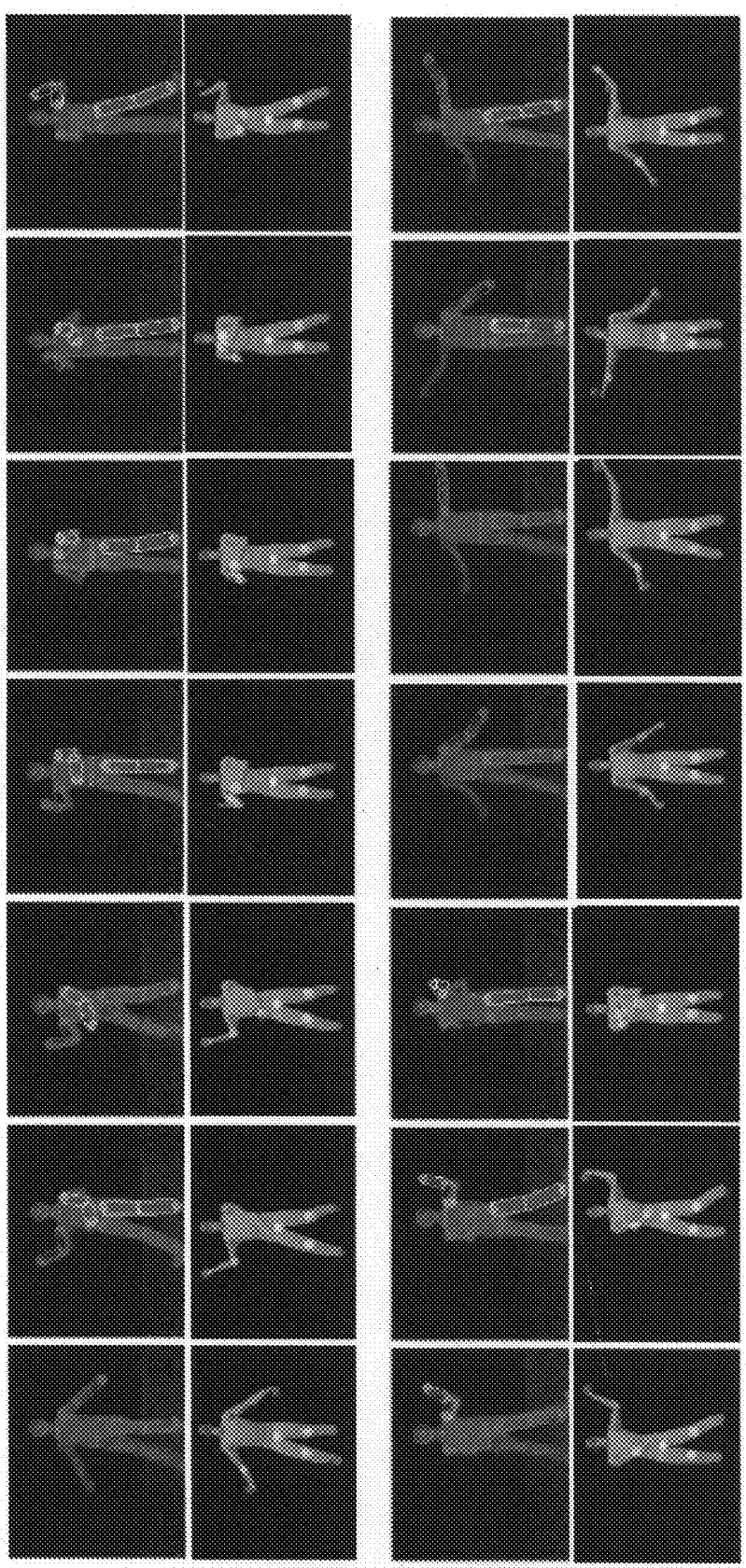

The sequence in FIG. 9G does not contain self-occlusions. The key-points are detected simply by performing skeleton analysis. In the presence of self-occlusions, the described algorithm is able to track limb segments through the intermittent occlusions between left and right leg as shown in FIG. 9H, as well as intermittent occlusions between left and right arm as shown in FIG. 9E. The arm detection is able to detect the re-appearing arms as shown in the last two images of FIG. 9D. We are able to make a correct arm labeling decision based on the spatial and temporal context information.

Various occlusion scenarios are shown in the figures as well. The H-N-T template detection is robust when the arm occludes the head as shown in FIGS. 9A, 9D, and 9E. The left and right arm labeling is robust when the arms interact with each other as shown in FIG. 9E.

The test result confirms that the joint limits and self penetration constraints are not violated in these sequences as well as several other sequences obtained using the time-of-flight sensor.

For further detail of the test, please refer to U.S. Provisional Application No. 61/204,869, filed Jan. 9, 2009, the content of which is incorporated by reference herein in its entirety.

Additional Embodiments

The above embodiments describe a pose estimation system for estimating body poses of a human actor in real time. One skilled in the art would understand that the pose estimation system can be used for pose estimation of other motion generators such as animals. In addition, the pose estimation system can be configured to provide additional functions such as motion retargeting, robotic motion generation and control, and joint torque estimation in biomechanics. For example, the output of the pose estimation system can be effectively used to transfer human motion to a humanoid robot in real time.

Embodiments of the disclosed invention provides a computationally fast, model based control theoretic approach to estimate human pose from a small number of features detected using a probabilistic inferencing algorithm. The disclosed pose estimation system can successfully reconstruct poses of difficult motion sequences which many previous approaches would have difficulty. In addition, the pose estimation system can reliably recover human poses from a small set of features.

Some portions of above description describe the embodiments in terms of algorithmic processes or operations, for example, the processes and operations as described with FIGS. 3 and 4A-C.

One embodiment of the present invention is described above with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer based method for estimating a pose of a human actor, the method comprising:
receiving a depth image of the human actor;
detecting a head, neck, and trunk (H-N-T) template of the human actor based on the depth image;

generating a skeleton image of the human actor;
detecting a plurality of end points of the skeleton image;
determining whether self occlusion is present in the depth image, the determining comprising:
   determining whether four of the detected end points correspond to hands and feet of the human actor;
   determining whether lengths of skeletonized branches between the detected end points corresponding to the hands and feet of the human actor and corresponding entry points of the H-N-T template exceed a minimum distance;
   determining that self occlusion is not present if (1) four of the detected end points correspond to the hands and feet of the human actor, and (2) the lengths of the skeletonized branches exceed the minimum distance; and
   determining that self occlusion is present if (1) no more than three of the detected end points correspond to the hands and feet of the human actor, or (2) the length of at least one of the skeletonized branches does not exceed the minimum distance;
responsive to self occlusion being determined present in the depth image,
   detecting a plurality of limb regions in the depth image,
   calculating a probability for each pixel of each detected limb region for a likelihood of the pixel belonging to a particular limb in the depth image, and
   assigning a label for each limb region based on the calculated probabilities of its pixels;
detecting a plurality of features of the human actor based on the H-N-T and template the labels assigned to the limb regions; and
estimating a pose of the human actor in a human model based on the features and kinematic constraints of the human model.

2. The method of claim 1, further comprising:
segmenting image regions of the human actor from image regions of background in the depth image.

3. The method of claim 2, wherein segmenting the image regions of the human actor comprises:
identifying image regions in the depth image with depth values exceeding a predetermined depth working volume as background; and
identifying image regions with vertical depth image normal vectors as background.

4. The method of claim 1, further comprising:
detecting an open limb region in the distance transformed skeleton image;
detecting a loop region formed by a limb and the H-N-T template in the distance transformed skeleton image; and
conducting depth slicing analysis to detect an occluding limb region occluding the H-N-T template.

5. The method of claim 1, wherein responsive to self occlusion being determined present in the depth image, the method further comprises:
determining an occlusion state of each limb region based on the calculated probabilities of its pixels; and wherein the labels are assigned based on the occlusion state as well the calculated probabilities.

6. The method of claim 1, wherein detecting the plurality of features of the human actor comprises:
localizing the plurality of features of the human actor based on the H-N-T template, the detected end points and corresponding entry points on the H-N-T template, and intersection points on the detected limbs.

7. The method of claim 1, comprising
augmenting missing features based on previously generated corresponding predicted features, wherein the augmented features comprises at least one from the group consisting of head center, left shoulder, right shoulder, left elbow, right elbow, left wrist, right wrist, waist, left hip, right hip, left knee, right knee, left ankle, and right ankle.

8. The method of claim 7, further comprising:
responsive to detecting multiple candidates for one of the plurality of features in the image, identify a candidate as the one of the plurality of features based on a previously generated corresponding predicted feature.

9. The method of claim 7, wherein estimating the pose of the human actor in the human model further comprises:
tracking the estimated pose of the human model with an observed pose of the human actor.

10. The method of claim 7, further comprising:
generating predicted features based on the augmented features and the kinematic constraints of the human model, wherein the kinematic constraints of the human model comprise at least one from the group consisting of joint limitations and self-penetration avoidance.

11. A system for estimating a pose of a human actor, the system comprising:
a computer processor for executing executable computer program code;
a computer-readable storage medium containing the executable computer program code for performing a method comprising:
   receiving a depth image of the human actor;
   detecting a head, neck, and trunk (H-N-T) template of the human actor based on the depth image;
   generating a skeleton image of the human actor;
   detecting a plurality of end points of the skeleton image;
   determining whether self occlusion is present in the depth image, the determining comprising:
      determining whether four of the detected end points correspond to hands and feet of the human actor;
      determining whether lengths of skeletonized branches between the detected end points corresponding to the hands and feet of the human actor and corresponding entry points of the H-N-T template exceed a minimum distance;
      determining that self occlusion is not present if (1) four of the detected end points correspond to the hands and feet of the human actor, and (2) the lengths of the skeletonized branches exceed the minimum distance; and
      determining that self occlusion is present if (1) no more than three of the detected end points correspond to the hands and feet of the human actor, or (2) the length of at least one of the skeletonized branches does not exceed the minimum distance;
   responsive to self occlusion being determined present in the depth image,
      detecting a plurality of limb regions in the depth image,
      calculating a probability for each pixel of each detected limb region for a likelihood of the pixel belonging to a particular limb in the depth image, the probability calculated based on (1) previously generated predicted limb poses from an earlier-in-time depth image and (2) previous occlusion states of the limbs from the earlier-in-time depth image, and
      assigning a label for each limb region based on the calculated probabilities of its pixels;

detecting a plurality of features of the human actor based on the H-N-T and template the labels assigned to the limb regions; and estimating a pose of the human actor in a human model based on the features and kinematic constraints of the human model.

12. The method of 1, wherein the probability for each pixel of each detected limb region for the likelihood of the pixel belonging to the particular limb in the depth image is calculated based on (1) previously generated predicted limb poses from an earlier-in-time depth image and (2) previous occlusion states of the limbs from the earlier-in-time depth image.

13. The system of claim 11, wherein the executable computer program code for performing the method further comprises:

segmenting image regions of the human actor from image regions of background in the depth image.

14. The system of claim 13, wherein segmenting the image regions of the human actor comprises:

identifying image regions in the depth image with depth values exceeding a predetermined depth working volume as background; and identifying image regions with vertical depth image normal vectors as background.

15. The system of claim 11, wherein the executable computer program code for performing the method further comprises:

detecting an open limb region in the distance transformed skeleton image;

detecting a loop region formed by a limb and the H-N-T template in the distance transformed skeleton image; and conducting depth slicing analysis to detect an occluding limb region occluding the H-N-T template.

16. The system of claim 11, wherein responsive to self occlusion being determined present in the depth image, the executable computer program code for performing the method further comprises:

determining an occlusion state of each limb region based on the calculated probabilities of its pixels; and wherein the labels are assigned based on the occlusion state as well the calculated probabilities.

17. The system of claim 11, wherein detecting the plurality of features of the human actor comprises:

localizing the plurality of features of the human actor based on the H-N-T template, the detected end points and corresponding entry points on the H-N-T template, and intersection points on the detected limbs.

18. The system of claim 11, wherein the executable computer program code for performing the method further comprises:

augmenting missing features based on previously generated corresponding predicted features, wherein the augmented features comprise at least one from the group consisting of head center, left shoulder, right shoulder, left elbow, right elbow, left wrist, right wrist, waist, left hip, right hip, left knee, right knee, left ankle, and right ankle.

19. The system of claim 18, wherein the executable computer program code for performing the method further comprises:

responsive to detecting multiple candidates for one of the plurality of features in the image, identify a candidate as the one of the plurality of features based on a previously generated corresponding predicted feature.

20. The system of claim 18, wherein estimating the pose of the human actor in the human model further comprises:

tracking the estimated pose of the human model with an observed pose of the human actor.

21. The system of claim 18, wherein the executable computer program code for performing the method further comprises:

generating predicted features based on the augmented features and the kinematic constraints of the human model, wherein the kinematic constraints of the human model comprise at least one from the group consisting of joint limitations and self-penetration avoidance.

22. The system of 11, wherein the probability for each pixel of each detected limb region for the likelihood of the pixel belonging to the particular limb in the depth image is calculated based on (1) previously generated predicted limb poses from an earlier-in-time depth image and (2) previous occlusion states of the limbs from the earlier-in-time depth image.

* * * * *